(12) United States Patent
Douglas et al.

(10) Patent No.: US 7,753,072 B2
(45) Date of Patent: Jul. 13, 2010

(54) VALVE ASSEMBLIES INCLUDING AT LEAST THREE CHAMBERS AND RELATED METHODS

(75) Inventors: Kevin R. Douglas, Lockport, IL (US); William O. Teach, Frankfort, IL (US); Paul W. Gibson, Manteno, IL (US); Donald C. Harris, Crete, IL (US); Scott H. Goodwin, Hillsborough, NC (US); David E. Dausch, Raleigh, NC (US); Wayne D. Dettloff, Wake Forest, NC (US)

(73) Assignee: AFA Controls LLC, Wilmington, DE (US)

( * ) Notice: Subject to any disclaimer, the term of this patent is extended or adjusted under 35 U.S.C. 154(b) by 758 days.

(21) Appl. No.: 11/188,139

(22) Filed: Jul. 22, 2005

(65) Prior Publication Data

US 2006/0016481 A1    Jan. 26, 2006

Related U.S. Application Data

(60) Provisional application No. 60/590,483, filed on Jul. 23, 2004, provisional application No. 60/590,669, filed on Jul. 23, 2004.

(51) Int. Cl.
*F15B 13/043* (2006.01)
(52) U.S. Cl. .............. 137/596.18; 137/596; 137/596.17; 251/129.01
(58) Field of Classification Search .................. 137/596, 137/596.17, 596.18; 251/129.01
See application file for complete search history.

(56) References Cited

U.S. PATENT DOCUMENTS

| | | | |
|---|---|---|---|
| 2,851,618 A | 8/1958 | Krawinkel | |
| 2,927,255 A | 3/1960 | Diesel | |
| 2,942,077 A | 6/1960 | Diesel | |
| 3,038,449 A * | 6/1962 | Murphy, Jr et al. | 91/31 |
| 3,772,537 A | 11/1973 | Clifford et al. | |
| 3,796,976 A | 3/1974 | Heng et al. | |

(Continued)

FOREIGN PATENT DOCUMENTS

CH          677136          4/1991

(Continued)

OTHER PUBLICATIONS

International Search Report and Written Opinion of the International Searching Authority for Application No. PCT/US2005/026030 mailed on Nov. 24, 2005.

(Continued)

*Primary Examiner*—Stephen Hepperle
*Assistant Examiner*—William McCalister
(74) *Attorney, Agent, or Firm*—Myers Bigel Sibley & Sajovec, P.A.

(57) ABSTRACT

A valve assembly may include a main housing and first and second electro-statically actuated valves. The main housing may define at least three chambers, with a first chamber configured to be coupled to a high pressure supply port, a second chamber configured to be coupled to an output port, and a third chamber configured to be coupled to a low pressure exhaust port. The first electro-statically actuated valve may be provided between the first and second chambers, and the first electro-statically actuated valve may allow or substantially block fluid communication between the first chamber and the second chamber responsive to a first electrical signal. The second electro-statically actuated valve may be provided between the second and third chambers, and the second electro-statically actuated valve may allow or substantially block fluid communication between the second chamber and the third chamber responsive to a second electrical signal. Related methods are also discussed.

48 Claims, 19 Drawing Sheets

U.S. PATENT DOCUMENTS

| | | |
|---|---|---|
| 3,989,357 A | 11/1976 | Kalt |
| 4,317,611 A | 3/1982 | Petersen |
| 4,336,536 A | 6/1982 | Kalt et al. |
| 4,516,091 A | 5/1985 | Sasser |
| 4,518,011 A * | 5/1985 | Stoll .................... 137/596.17 |
| 4,530,317 A | 7/1985 | Schutten |
| 4,554,519 A | 11/1985 | Adam |
| 4,581,624 A | 4/1986 | O'Connor |
| 4,585,209 A | 4/1986 | Aine et al. |
| 4,598,585 A | 7/1986 | Boxenhorn |
| 4,662,746 A | 5/1987 | Hornbeck |
| 4,692,727 A | 9/1987 | Wakino et al. |
| 4,710,732 A | 12/1987 | Hornbeck |
| 4,736,202 A | 4/1988 | Simpson et al. |
| 4,747,670 A | 5/1988 | Devio et al. |
| 4,756,508 A | 7/1988 | Giachino et al. |
| 4,789,803 A | 12/1988 | Jacobsen et al. |
| 4,794,370 A | 12/1988 | Simpson et al. |
| 4,826,131 A | 5/1989 | Mikkor |
| 4,857,757 A | 8/1989 | Sato et al. |
| 4,971,106 A | 11/1990 | Tsutsui et al. |
| 5,016,072 A | 5/1991 | Greiff |
| 5,043,043 A | 8/1991 | Howe et al. |
| 5,051,643 A | 9/1991 | Dworsky et al. |
| 5,061,049 A | 10/1991 | Hornbeck |
| 5,065,978 A | 11/1991 | Albarda et al. |
| 5,083,857 A | 1/1992 | Hornbeck |
| 5,097,354 A | 3/1992 | Goto |
| 5,164,688 A | 11/1992 | Larson |
| 5,168,249 A | 12/1992 | Larson |
| 5,172,262 A | 12/1992 | Hornbeck |
| 5,179,499 A | 1/1993 | MacDonald et al. |
| 5,202,785 A | 4/1993 | Nelson |
| 5,203,208 A | 4/1993 | Bernstein |
| 5,212,582 A | 5/1993 | Nelson |
| 5,216,273 A | 6/1993 | Doering et al. |
| 5,233,459 A | 8/1993 | Bozler et al. |
| 5,258,591 A | 11/1993 | Buck |
| 5,260,596 A | 11/1993 | Dunn et al. |
| 5,268,696 A | 12/1993 | Buck et al. |
| 5,271,724 A | 12/1993 | Van Lintel |
| 5,278,368 A | 1/1994 | Kasano et al. |
| 5,311,360 A | 5/1994 | Bloom et al. |
| 5,323,999 A | 6/1994 | Bonne et al. |
| 5,344,454 A | 9/1994 | Clarke et al. |
| 5,349,855 A | 9/1994 | Bernstein et al. |
| 5,353,656 A | 10/1994 | Hawkey et al. |
| 5,367,136 A | 11/1994 | Buck |
| 5,367,584 A | 11/1994 | Ghezzo et al. |
| 5,392,650 A | 2/1995 | O'Brien et al. |
| 5,408,355 A | 4/1995 | Rauch et al. |
| 5,408,877 A | 4/1995 | Greiff et al. |
| 5,441,597 A | 8/1995 | Bonne et al. |
| 5,460,202 A | 10/1995 | Hanley et al. |
| 5,479,042 A | 12/1995 | James et al. |
| 5,488,863 A | 2/1996 | Mochida et al. |
| 5,492,596 A | 2/1996 | Cho |
| 5,496,436 A | 3/1996 | Bernstein et al. |
| 5,507,911 A | 4/1996 | Greiff |
| 5,515,724 A | 5/1996 | Greiff et al. |
| 5,530,342 A | 6/1996 | Murphy |
| 5,535,902 A | 7/1996 | Greiff |
| 5,536,988 A | 7/1996 | Zhang et al. |
| 5,543,765 A | 8/1996 | Cachier |
| 5,544,001 A | 8/1996 | Ichiya et al. |
| 5,552,925 A | 9/1996 | Worley |
| 5,578,976 A | 11/1996 | Yao |
| 5,616,864 A | 4/1997 | Johnson et al. |
| 5,619,061 A | 4/1997 | Goldsmith et al. |
| 5,620,933 A | 4/1997 | James et al. |
| 5,627,396 A | 5/1997 | James et al. |
| 5,629,565 A | 5/1997 | Schlaak et al. |
| 5,629,790 A | 5/1997 | Neukerman et al. |
| 5,635,638 A | 6/1997 | Geen |
| 5,635,639 A | 6/1997 | Greiff et al. |
| 5,635,640 A | 6/1997 | Geen |
| 5,635,739 A | 6/1997 | Grieff et al. |
| 5,638,946 A | 6/1997 | Zavracky |
| 5,640,133 A | 6/1997 | MacDonald et al. |
| 5,644,177 A | 7/1997 | Guckel et al. |
| 5,650,568 A | 7/1997 | Greiff et al. |
| 5,652,374 A | 7/1997 | Chia et al. |
| 5,656,778 A | 8/1997 | Roszhart |
| 5,661,592 A | 8/1997 | Bornstein et al. |
| 5,666,258 A | 9/1997 | Gevatter et al. |
| 5,673,139 A | 9/1997 | Johnson |
| 5,673,785 A | 10/1997 | Schlaak et al. |
| 5,677,823 A | 10/1997 | Smith |
| 5,696,662 A | 12/1997 | Bauhahn |
| 5,723,894 A | 3/1998 | Ueno et al. |
| 5,759,870 A | 6/1998 | Yun et al. |
| 5,785,295 A | 7/1998 | Tsai |
| 5,810,325 A * | 9/1998 | Carr ....................... 251/30.02 |
| 5,818,683 A | 10/1998 | Fujii |
| 5,862,003 A | 1/1999 | Saif et al. |
| 5,897,097 A | 4/1999 | Biegelsen et al. |
| 5,914,553 A | 6/1999 | Adams et al. |
| 5,921,280 A * | 7/1999 | Ericksen et al. ........ 137/624.11 |
| 5,975,485 A | 11/1999 | Tsai et al. |
| 6,003,833 A | 12/1999 | Tasi et al. |
| 6,032,689 A | 3/2000 | Tsai et al. |
| 6,032,923 A | 3/2000 | Biegelsen et al. |
| 6,036,597 A * | 3/2000 | Arner ........................ 460/6 |
| 6,057,814 A | 5/2000 | Kalt |
| 6,067,183 A | 5/2000 | Furlani et al. |
| 6,089,534 A | 7/2000 | Biegelsen et al. |
| 6,098,661 A | 8/2000 | Yim et al. |
| 6,116,517 A | 9/2000 | Heinzl et al. |
| 6,120,002 A | 9/2000 | Biegelsen et al. |
| 6,126,140 A | 10/2000 | Johnson et al. |
| 6,127,908 A | 10/2000 | Bozler et al. |
| 6,142,444 A | 11/2000 | Kluge |
| 6,166,863 A | 12/2000 | Ohtake |
| 6,168,395 B1 | 1/2001 | Quenzer et al. |
| 6,179,586 B1 | 1/2001 | Herb et al. |
| 6,223,088 B1 | 4/2001 | Scharnberg et al. |
| 6,227,824 B1 | 5/2001 | Stehr |
| 6,229,683 B1 | 5/2001 | Goodwin-Johansson |
| 6,229,684 B1 | 5/2001 | Cowen et al. |
| 6,236,491 B1 | 5/2001 | Goodwin-Johansson |
| 6,397,880 B1 | 6/2002 | Stoll et al. |
| 6,499,509 B2 | 12/2002 | Berger et al. |
| 6,581,638 B2 | 6/2003 | Frisch et al. |
| 6,590,267 B1 * | 7/2003 | Goodwin-Johansson et al. ......................... 257/415 |
| 6,621,141 B1 | 9/2003 | Van Schuylenbergh et al. |
| 6,663,078 B1 | 12/2003 | Stoll et al. |
| 6,684,469 B2 | 2/2004 | Horning et al. |
| 6,730,072 B2 | 5/2004 | Shawgo et al. |
| 6,986,500 B2 | 1/2006 | Giousouf et al. |
| 7,014,165 B2 | 3/2006 | Ji et al. |
| 2001/0039968 A1 | 11/2001 | Dettmann |
| 2003/0106420 A1 | 6/2003 | Yoshino |
| 2004/0022681 A1 | 2/2004 | Hantschel et al. |
| 2004/0124384 A1 | 7/2004 | Biegelsen et al. |
| 2004/0144939 A1 | 7/2004 | Giousouf et al. |
| 2006/0016481 A1 | 1/2006 | Douglas et al. |

FOREIGN PATENT DOCUMENTS

| | | |
|---|---|---|
| DE | 3006231 | 8/1981 |
| DE | 4235593 | 10/1993 |
| DE | 44 17 251 | 11/1995 |
| DE | 195 22 806 | 1/1997 |

| EP | 0 435 237 | 7/1994 |
| EP | 0400482 | 11/1994 |
| EP | 478956 | 5/1995 |
| EP | 834759 | 4/1998 |
| EP | 665590 | 9/1999 |
| EP | 0 485 739 | 9/2000 |
| EP | 0 829 649 | 10/2002 |
| FR | 2642812 | 2/1989 |
| GB | 2 334 000 | 8/1999 |
| WO | WO 02/22492 A2 | 3/2002 |

OTHER PUBLICATIONS

International Search Report and Written Opinion of the International Searching Authority for International Patent Application No. PCT/US2005/026029 mailed on Jan. 27, 2006.

Wu "Inductive Links with Integrated Receiving Coils for MEMS and Implantable Applications" Dissertation, University of Notre Dame, Sep. 2003.

Koeneman et al. "Feasibility of Micro Power Supplies for MEMS" *Journal of Microelectromechanical Systems* 6(4): 355-362 (1997).

Lisec et al. "A Bistable Pneumatic Microswitch for Driving Fluidic Components" *8th International Conference on Solid-State Sensors and Actuators, and Eurosensors IX* pp. 309-312 (1995).

Breng et al. "Electrostatic Micromechanic Actuators" *Micromechanical Microengineering 2*, pp. 256-261, IOP Publishing Ltd., UK. (1992).

Burkert Contromatic Corporation "Technical Principles of Valves" brochure (no date).

Buser et al "Very High Q-factor Resonators in Monocrystalline Silicon" *Sensors and Actuators* pp. 323-327 (1990).

Elwenspoek et al. "Active Joints for Microrobot Limbs" *J. Micromechanical Microengineering 2*, pp. 221-223, IOP Publishing Ltd., UK. (1992).

Elwenspoek et al. "Static and Dynamic Properties of Active Joints" *The 8.sup.th Annual Conference on Solid-State Sensors and Actuators, and Eurosensors* (Jun. 1995) pp. 412-415.

Gunawan et al. "Micromachined Corner Cube Reflectors as a Communication Link" *Sensors and Actuators* (1995) pp. 580-583.

Haji-Babaei et al. "Integrable Active Microvalve with Surface Micromachined Curled-Up Actuator" *IEEE International Conference on Solid-State Sensors and Actuators* (Jun. 1997) pp. 833-836.

Jaecklin et al "Mechanical and Optical Properties of Surface Micromachined Torsional Mirrors in Silicon, Polysilicon and Aluminum" *The 7th International Conference on Solid-State Sensors and Actuators* (No date) pp. 958-961.

Jaecklin et al. "Optical Microshutters and Torsional Micromirrors for Light Modulator Arrays", *IEEE*. (1993).

Klaassen et al. "Silicon Fusion Bonding and Deep Reactive Ion Etching; A New Technology for Microstructures" *The 8.sup.th International Conference on Solid State Sensors and Actuators, and Eurosensors* (Jun. 1995) pp. 556-559.

Kohl, et al. "Development of Stress-Optimised Shape Memory Microvalves" *Sensors and Accuators* 72(3): 243-250 (1999).

Legtenberg et al. "Electrostatic Curved Electrode Actuators" *IEEE Micro Electro Mechanical Systems* (Jan.-Feb. 1995) pp. 37-42.

Petersen "Silicon Torsional Scanning Mirror" *IBM J. Res. Develop.*, vol. 24, No. 5. (Sep. 1980).

Schiele et al. "Surface-Micromachined Electrostatic Microrelay" *Sensors and Actuators A 66*, Elsevier Science S.A. (1998).

* cited by examiner

| LOGIC RELATIONSHIP BETWEEN INPUTS AND OUTPUTS | | | | | | | | | | | |
|---|---|---|---|---|---|---|---|---|---|---|---|
| CONFIGURATION DECRIPTION | CONFIGURATION SELECTION | | | INPUT SIGNALS | | HIGH VOLTAGE OUTPUTS (F) | | | | LED OUTPUT | |
| | C1 | C2 | C3 | A | B | 1 | 2 | 3 | 4 | A | B |
| 5 WAY 3 POS - CYL PORTS EXHAUSTED | 0 | 0 | X | 0 | 0 | 0 | 1 | 1 | 0 | 1 | 1 |
| | 0 | 0 | X | 0 | 1 | 0 | 1 | 0 | 1 | 0 | 1 |
| | 0 | 0 | X | 1 | 0 | 1 | 0 | 1 | 0 | 1 | 0 |
| | 0 | 0 | X | 1 | 1 | 0 | 1 | 1 | 0 | 1 | 1 |
| ON POWER LOSS - GO TO 00 STATE | 0 | 0 | 0 | X | X | 0 | 1 | 1 | 0 | 0 | 0 |
| ON POWER LOSS - HOLD STATE | 0 | 0 | 1 | X | X | HOLD POSITION | | | | 0 | 0 |
| 5 WAY 3 POS - ALL PORTS BLOCKED | 0 | 1 | X | 0 | 0 | 1 | 1 | 1 | 1 | 1 | 1 |
| | 0 | 1 | X | 0 | 1 | 0 | 1 | 0 | 1 | 0 | 1 |
| | 0 | 1 | X | 1 | 0 | 1 | 0 | 1 | 0 | 1 | 0 |
| | 0 | 1 | X | 1 | 1 | 1 | 1 | 1 | 1 | 1 | 1 |
| ON POWER LOSS - GO TO 00 STATE | 0 | 1 | 0 | X | X | 1 | 1 | 1 | 1 | 0 | 0 |
| ON POWER LOSS - HOLD STATE | 0 | 1 | 1 | X | X | HOLD POSITION | | | | 0 | 0 |
| 5 WAY 3 POS - CYL PORTS ENEGIZED | 1 | 0 | X | 0 | 0 | 1 | 0 | 0 | 1 | 1 | 1 |
| | 1 | 0 | X | 0 | 1 | 0 | 1 | 0 | 1 | 0 | 1 |
| | 1 | 0 | X | 1 | 0 | 1 | 0 | 1 | 0 | 1 | 0 |
| | 1 | 0 | X | 1 | 1 | 1 | 0 | 0 | 1 | 1 | 1 |
| ON POWER LOSS - GO TO 00 STATE | 1 | 0 | 0 | X | X | 1 | 0 | 0 | 1 | 0 | 0 |
| ON POWER LOSS - HOLD STATE | 1 | 0 | 1 | X | X | HOLD POSITION | | | | 0 | 0 |
| 5 WAY 2 POSITION | 1 | 1 | X | X | 0 | 0 | 1 | 0 | 1 | 1 | 1 |
| | 1 | 1 | X | X | 1 | 1 | 0 | 1 | 0 | 0 | 1 |
| ON POWER LOSS - GO TO 0 STATE | 1 | 1 | 0 | X | X | 0 | 1 | 0 | 1 | 0 | 0 |
| ON POWER LOSS - HOLD STATE | 1 | 1 | 1 | X | X | HOLD POSITION | | | | 0 | 0 |

*FIG. 12*

| SEQUENCE TO TRAVERSE FROM ONE STATE TO ANOTHER | | |
|---|---|---|
| FROM | TO | TRANSITION SEQUENCE |
| 0101 | 1010 | 1101,1001,1011,1010 |
| 1010 | 0101 | 1011,1001,1101,0101 |
| 0101 | 1111 | 1101,1111 |
| 1111 | 0101 | 1101,0101 |
| 0101 | 0110 | 0111,0110 |
| 0110 | 0101 | 0111,0101 |
| 0101 | 1001 | 1101,1001 |
| 1001 | 0101 | 1101,0101 |
| 1010 | 1111 | 1011,1111 |
| 1111 | 1010 | 1011,1010 |
| 1010 | 0110 | 1011,1111,0111,0110 |
| 0110 | 1010 | 1110,1010 |
| 1010 | 1001 | 1110,1001 |
| 1001 | 1010 | 1011,1010 |
| POLARITY REVERSAL | | TRANSITION SEQUENCE |
| | 0101 | 1101,1001,1011,1̄01̄0,1011,1001,1101,0101 |
| | 1010 | 1011,1001,1101,0̄1̄01,1101,1001,1011,1010 |
| | 1111 | 1101,0̄1̄01,1101,1001,1011,1̄01̄0,1011,1111 |
| | 0110 | 0111,0̄1̄01,1101,1001,1011,1̄01̄0,1011,1111,0111,0110 |
| | 1001 | 1101,0̄1̄01,1101,1001,1011,1̄01̄0,1011,1001 |

*FIG. 13*

| PIN DEFINITIONS | |
|---|---|
| PINS | DESCRIPTION |
| VDD | NOMINAL 24V POWER SUPPLY SIGNAL/PIN. |
| GND | GROUND / POWER SUPPLY RETURN SIGNAL/PIN. |
| VBAT | POSITIVE BATTERY SUPPLY SIGNAL/PIN. FOR EXAMPLE, A 3V LITHIUM BATTERY MAY BE USED TO MAINTAIN CHARGE ON THE FOUR OUTPUT PINS WHEN VDD FAILS. |
| GBAT | NEGATIVE BATTERY RETURN SIGNAL/PIN. MAY BE BENEFICIAL FOR COMPLETELY SWITCHING OUT BATTERY FOR NORMAL OPERATION SO THAT NO DRAIN OCCURS WHEN VDD IS ACTIVE. |
| C1,C2,C3 | CONFIGURATION SELECT SIGNAL/PINS. THE PINS MAY BE JUMPERED OR HARDWIRED AT TIME OF ASSEMBLY TO GND (FOR A "0") OR LEFT FLOATING (FOR A "1"). WITH THREE CONFIGURATION SELECTION SIGNAL/PINS, ONE OF 8 DEVICE CONFIGURATIONS MAY BE SELECTED TO PROVIDE FUNCTIONALITY OF A PARTICULAR MECHANICAL DEVICE. THE DIFFERENT CONFIGURATIONS MAY PROVIDE DIFFERENT OPERATIONS DURING POWER LOSS AND/OR WHEN INPUT CONTROL SIGNALS A AND B ARE EQUAL. THE POWER SUPPLY SIGNAL VDD MAY BE USED TO PULL ANY FLOATING CONFIGURATIONS SELECT SIGNALS UP DURING NORMAL OPERATIONS, THE CONFIGURATION SELECT SIGNALS MAY BE LATCHED DURING LOSS OF THE POWER SUPPLY SIGNAL VDD SO THAT LIMITED BATTERY POWER IS NOT CONSUMED PULLING UP CONFIGURATIONS SELECT SIGNALS DURING POWER LOW. |
| A,B | INPUT CONTROL SIGNAL/PINS. A CURSORY INSPECTION OF THE TABLE 1 REVEALS THAT OUTPUTS F1 AND F3 ESSENTIALLY REFLECT INPUT A, LIKEWISE FOR F2 AND F4 WITH RESPECT TO INPUT B. THESE TWO INPUTS REQUIRE CIRCUITRY TO PREVENT SWITCHING DUE TO SPURIOUS ARTIFACTS ($t_{sup}$) |
| F1, F2, F3, F4 | HIGH VOLTAGE OUTPUT SIGNALS/PINS. EACH HV OUTPUT SIGNAL MAY DRIVE A FULLY ACTUATED CAPACITANCE OF APPROXIMATELY 2nF. FOR A SWITCHING SPEED OF 100μs (microseconds), A PEAK CURRENT OF APPROXIMATELY 4 ma (2nF * 200V/100μs) MAY BE REQUIRED. A MAXIMUM LEAKAGE FOR EACH OF THE VALVE CHIPS MAY BE APPROXIMATELY 10 pA WITH A 200 VOLT ELECTRICAL POTENTIAL APPLIED THERETO. |
| HComO, HComE | HIGH VOLTAGE COMMON ODD AND EVEN SIGNALS/PINS. VOLTAGES OF HV OUTPUT SIGNALS/PINS F1 AND F3 ARE APPLIED WITH RESPECT TO THE HComO COMMON SIGNAL/PIN. VOLTAGES OF HV OUTPUT SIGNALS/PINS F2 AND F4 ARE APPLIED WITH RESPECT TO THE HComE SIGNAL/PIN. BECAUSE THE VALVE CHIPS ARE ELECTROSTATICALLY ACTUATED, ACTUATION IS ACHIEVED BY PROVIDING A DIFFERENCE IN VOLTAGE POTENTIAL, BUT THE POLARITY OF THE DIFFERENCE DOES NOT MATTER. THIS TRAIT MAY BE USED TO REDUCE CHARGE BUILD-UP. BY PERIODICALLY REVERSING THE DIRECTION/POLARITY OF THE VOLTAGE DIFFERENCE BETWEEN THE HIGH VOLTAGE OUTPUTS AND THE COMMON SIGNALS/PINS, EFFECTS DUE TO CHARGE BUILD UP MAY BE REDUCED. PROVIDING TWO DIFFERENT COMMON SIGNALS/PINS MAY SIMPLIFY A SEQUENCING OPERATION USED TO REVERSE POLARITY. |

*FIG. 14A*

| | |
|---|---|
| HVDD | HIGH VOLTAGE SUPPLY SIGNAL/PIN. THE HV SUPPLY SIGNAL/PIN MAY PROVIDE THE HIGH VOLTAGE POTENTIAL THAT IS SWITCHED TO THE HV OUTPUT SIGNALS/PINS F1-F4. A RELATIVELY LARGE, HIGH VOLTAGE, EXTERNAL STORAGE CAPACITOR MAY BE COUPLED TO THE ASIC 2001 ON THIS SIGNAL/PIN FOR THE REGULATION AND ENERGY STORAGE. COMBINATIONS OF ON-CHIP AND/OR EXTERNAL CIRCUITRY MAY BE PROVIDED TO LOCALLY GENERATE THIS THE HIGH VOLTAGE SUPPLY SIGNAL FROM VDD AND/OR VBat. |
| LXH | INDUCTOR SWITCH HIGH SIGNAL/PIN. A SIMPLE YET EFFECTIVE METHOD OF GENERATING. THE HIGH VOLTAGE SUPPLY SIGNAL HVDD MAY BE GENERATED FROM A LOW VOLTAGE SUPPLY BY SWITCHING CURRENT THROUGH AN INDUCTOR AT A CONTROLLED DUTY CYCLE. THE LXH SIGNAL/PIN MAY PROVIDE APPROPRIATE SWITCHING CHARACTERISTICS GENERATE AN APPROXIMATELY 200 V HVDD SIGNAL USING AN APPROXIMATELY 24 V VDD SIGNAL. |
| LXL | INDUCTOR SWITCH LOW SIGNAL/PIN. A SEPARATE CIRCUIT MAY BE USED TO GENERATE THE HIGH VOLTAGE SUPPLY SIGNAL HVDD FROM A 3V BATTERY, AND THE LXL SIGNAL/PIN MAY PROVIDE APPROPRIATE SWITCHING CHARACTERISTICS. THE HIGH VOLTAGE GENERATION CIRCUIT 2013 MAY BOOST THE V BATTERY SIGNAL VBAT TO 24V WHICH IS FED BACK TO THE VDD SIGNAL/PIN, AND THE HIGH VOLTAGE GENERATION CIRCUIT CAN THEN CONVERT THE 24 V SIGNAL TO THE 200 V HVDD SIGNAL AS DISCUSSED ABOVE WITH REGARD TO THE LDH SIGNAL/PIN. |
| HVA | HIGH VOLTAGE ADJUST SIGNAL/PIN. A RESISTOR HVAR COUPLED TO THE HVA SIGNAL/PIN MAY SET A VOLTAGE LEVEL AT WHICH THE HIGH VOLTAGE GENERATION CIRCUIT 2013 CEASES BOOSTING. A VOLTAGE OF THE HV SUPPLY SIGNAL/PIN HVDD MAY THUS BE ADJUSTED, FOR EXAMPLE, IN THE RANGE OF APPROXIMATELY 50 VOLTS TO APPROXIMATELY 200 VOLTS. MOREOVER, A POWER DOWN MODE MAY BE PROVIDED FOR BATTERY MODE OPERATING DURING LOSS OF THE EXTERNAL POWER SUPPLY. |
| LED-A, LED-B, | LIGHT EMITTING DIODE SIGNALS/PINS. THE LIGHT EMITTING DIODE (LED) DRIVER CIRCUIT 2027 MAY GENERATE THE LED SIGNALS IN ACCORDANCE WITH LOGICAL OPERATIONS SHOWN IN TABLE 1. SHORT CIRCUIT PROTECTION MAY ALSO BE PROVIDED, AND THE LEDS MAY BE INACTIVE DURING LOSS OF PRIMARY EXTERNAL POWER. BOTH LED SIGNALS/PINS MAY BE CAPABLE OF SOURCING UP TO 30MA AT 2.2VDC. |

FIG. 14B

| SELECTED DESIGN PARAMETERS | | |
|---|---|---|
| PARAMETER | SPEC | NOTES |
| VDD | 24V +/- 10% | MAIN POWER SUPPLY SIGNAL. AT LEVELS BELOW THE SPECIFIED MINIMUM, POWER LOSS MAY BE DETECTED AND HV OUTPUTS SIGNALS F1-F4 MAY BE SWITCHED TO A POWER LOSS STATE |
| IDD | 200MA | VDD CURRENT MAXIMUM. A RELATIVELY ARBITRARY LIMIT MAY BE USED TO INDICATE A NON-CRITICAL NATURE OF OVERALL POWER CONSUMPTION. WITH A LOWER WORST CASE CURRENT, LOWER THE OPERATING TEMPERATURE MAY BE PROVIDED, BETTER NOISE MARGINS MAY BE PROVIDED, HIGHER THE RELIABILITY MAY BE PROVIDED, ETC |
| $I_{bat}$ | 1 TO 10μa TARGET | AVERAGE CURRENT FROM BATTERY DURING POWER LOSS MODES. UNDER NORMAL POWERED CONDITIONS, THERE MAY BE INSIGNIFICANT CURRENT DRAWN FROM THE BATTERY. IF THE AVERAGE BATTERY CURRENT EXCEEDS A TARGET VALUE, A LARGER BATTERY MAY NEED TO BE USED. |
| $V_{il}$ | -3 to +5 V | INPUT LOW VOLTAGE FOR C1, C2, C3, A AND B. BOARD LEVEL COMPONENTS MAY BE USED TO PROVIDE THAT THIS SPECIFICATION IS MET SO THAT THE INPUT DIODES TO SUBSTRATE ARE NOT FORWARD BIASED. |
| $V_{ih}$ | 10 V to 30 V | INPUT HIGH VOLTAGE FOR A AND B. BOARD LEVEL COMPONENTS MAY BE USED TO PROVIDE THAT THIS SPECIFICATION IS MET SO THAT THE INPUT DIODES TO VDD ARE NOT FORWARD BIASED. |
| $t_{rev}$ | 1 second to 1 hour | POLARITY REVERSAL TIME. A MAXIMUM LENGTH OF ELAPSED TIME TO WAIT IN AN OUTPUT STATE BEFORE A POLARITY REVERSAL OPERATION IS PERFORMED WHILE MAINTAINING THE SAME OUTPUT STATE MAY BE DETERMINED. THE POLARITY REVERSAL TIME MAY BE ON THE ORDER OF SECONDS OR POSSIBLY MINUTES |
| $t_{del}$ | 1 ms to 1 second | TRANSITION DELAY TIME. A MINIMUM LENGTH OF ELAPSED TIME TO WAIT BEFORE SWITCHING TO A PARTICULAR OUTPUT STATE DURING OUTPUT STATE TRANSITIONS. THE TRANSITION DELAY TIME MAY BE ON THE ORDER OF MILLISECONDS. |
| $t_{max}$ | 250Hz | MAXIMUM CYCLE FREQUENCY OF INPUTS. THE MAXIMUM CYCLE FREQUENCY MAY BE USED TO SET AN AVERAGE POWER TO BE GENERATED BY THE HIGH VOLTAGE GENERATION CIRCUIT DURING NORMAL OPERATION. |
| $t_{sw}$ | 100μs | MAXIMUM SWITCH TIME. A TIME TO CHARGE AND DISCHARGE HIGH VOLTAGE OUTPUT SIGNALS F1-F4. THIS PARAMETER MAY ALSO DETERMINE A CURRENT CAPABILITY OF A FINAL STAGE |

FIG. 15A

| $T_{SUP}$ | 1 μs | MINIMUM TIME PRIMARY INPUTS MAY BE HELD CONSTANT BEFORE TRANSITION IS DETECTED. THIS PARAMETER MAY BE USED BY THE DEGLITCH/DEBOUNCE LOGIC CIRCUIT 2017 TO REDUCE GLITCHES FROM INPUT SIGNALS A AND B SO THAT FALSE SWITCHING OF THE HV OUTPUT SIGNALS F1-F4 MAY BE REDUCED |
|---|---|---|
| $T_{OP}$ | 0-70°C | AMBIENT OPERATING TEMPERATURE |

FIG. 15B

US 7,753,072 B2

VALVE ASSEMBLIES INCLUDING AT LEAST THREE CHAMBERS AND RELATED METHODS

RELATED APPLICATIONS

This application claims the benefit of and priority to U.S. Provisional Application No. 60/590,483 filed Jul. 23, 2004, and to U.S. Provisional Application No. 60/590,669 filed Jul. 23, 2004. The disclosures of both of the above referenced provisional applications are hereby incorporated herein in their entirety by reference. This application is also related to U.S. Utility application Ser. No. 11/188,294 filed concurrently herewith and entitled "Microvalve Assemblies And Related Methods", the disclosure of which is hereby incorporated herein in its entirety by reference.

FIELD OF THE INVENTION

The present invention relates to the field of valves, and more particularly to microvalves and microvalve assemblies and related methods.

BACKGROUND

A conventional solenoid driven pneumatic valve may be used to control a fluid flow. When electrically energized or de-energized, a solenoid driven pneumatic valve may cut off and/or permit one or more fluid flows. An actuator of a solenoid driven pneumatic valve is an electromagnet. When the valve is energized, a magnetic field builds up to pull and/or push a plunger against the action of a spring. When de-energized, the plunger returns to its original position by action of the spring. Solenoid driven pneumatic valves are discussed, by way of example, in the reference "Technical Principles Of Valves" (omega.com, One Omega Drive, Stamford, Conn., 06907, J-3 to J-7), the disclosure of which is hereby incorporated herein in its entirety by reference.

A flow of air (or other fluid) through a valve may be a function of a number of controlled port connections and a number of switching positions. Directional valve functionalities may be described by referring to them as a combination of "ways" and "positions", such as, for example, a 4-way 2-position valve also referred to as a 4/2-way valve. The term "way" defines a number of controlled flow paths the valve has (indicated by arrows in ISO symbology). With respect to the term "position", a pneumatic directional valve may have two or three switching positions (indicated by squares in ISO symbology).

In a conventional 5-way, 2-position solenoid driven pneumatic valve (a 5/2 valve), fluid flows may be controlled between first and second actuator ports, first and second exhaust ports, and an air supply port. When the solenoid is energized, the 5/2 valve may provide fluid coupling between the air supply port and the first actuator port, and between the second actuator port and the second exhaust port. When the solenoid is de-energized, the 5/2 valve may provide fluid coupling between the air supply port and the second actuator port, and between the first actuator port and the first exhaust port. A 5/2 valve may thus be used to control operation of a pneumatic actuator coupled to the actuator ports.

A solenoid driven pneumatic valve, however, may be subject to mechanical wear that may reduce a useful life thereof. In addition, functionalities provided by a solenoid driven pneumatic valve may be limited. Moreover, a solenoid driven pneumatic valve may be unable to maintain an energized position in the event of a loss of power.

SUMMARY

According to some embodiments of the present invention, a valve assembly may include a main housing and first and second electro-statically actuated valves. The main housing may define at least three chambers, with a first chamber configured to be coupled to a high pressure supply port, a second chamber configured to be coupled to an output port, and a third chamber configured to be coupled to a low pressure exhaust port. The first electro-statically actuated valve may be provided between the first and second chambers wherein the first electro-statically actuated valve allows or substantially blocks fluid communication between the first chamber and the second chamber responsive to a first electrical signal. The second electro-statically actuated valve may be provided between the second and third chambers wherein the second electro-statically actuated valve allows or substantially blocks fluid communication between the second chamber and the third chamber responsive to a second electrical signal.

According to some additional embodiments of the present invention, a method may be provided to form a valve assembly. More particularly, a housing may be formed defining first, second, third, fourth, and fifth chambers. The first and second chambers may be separated by a first valve enclosure for a valve chip, the second and third chambers may be separated by a second valve enclosure for a valve chip, the third and fourth chambers may be separated by a third valve enclosure for a valve chip, and the fourth and fifth chambers may be separated by a fourth valve enclosure for a valve chip. Moreover, the chambers and valve enclosures may be open at an open end of the housing. After forming the housing, a valve chip may be inserted in one of the valve enclosures. The valve chip may include a substrate having a hole therein and an electro-statically actuated valve flap configured to open and close the valve hole, and opposite sides of the valve chip may be exposed to chambers on opposite sides of the valve enclosure. After inserting the valve chip, a base may be secured to the open end of the housing thereby closing the chambers and the valve enclosures.

According to more embodiments of the present invention, a mass flow controller may include a body having a high pressure supply chamber and a low pressure output chamber, and a valve chip separating the high pressure supply chamber and the low pressure output chamber. The valve chip may include a first side facing the high pressure supply chamber, a second side facing the low pressure output chamber, and a hole between the first and second sides. The valve chip may also include an electro-statically actuated valve flap on the second face with the valve flap being associated with the hole, and the flexible valve flap may be configured to open or substantially close the hole responsive to electrical signals applied thereto. In addition, a controller may be configured to control opening and closing the valve flap to maintain a mass flow through the valve chip.

According to yet more embodiments of the present invention, a method may be provided to control an electro-static valve. The electro-static valve may include a substrate having a hole therein and an electrostatically actuated valve flap. The valve flap may be associated with the hole in the substrate, and the valve flap may be configured to open or substantially close the hole responsive to electrical signals applied thereto. Moreover, opening and closing the electro-statically actuated valve flap may be modulated so that the valve provides a first resistance to flow during a first interval, a second resistance to flow during a second interval, and a third resistance to flow during a third interval, with the first, second, and third resistances being different.

According to still more embodiments of the present invention, a method may be provided to operate an electro-statically actuated device including a fixed electrode on a substrate and a flexible member having a flexible electrode. In particular, a first electrical potential may be applied between the fixed and flexible electrodes to actuate the flexible member. After applying the first electrical potential, an electrical potential between the fixed and flexible electrodes may be removed. After removing an electrical potential, a second electrical potential may be applied between the fixed and flexible electrodes wherein the first and second electrical potentials have reversed polarities.

According to yet more embodiments of the present invention, a method may be provided to operate an electro-statically actuated device including a fixed electrode on a substrate and a flexible member having a flexible electrode. In particular, a first electrical potential having a first magnitude may be applied between the fixed and flexible electrodes when the flexible member is spaced from the substrate to actuate the flexible member to a position more closely adjacent the substrate. After actuating the flexible member to the position more closely adjacent the substrate, a second electrical potential having a second magnitude may be applied between the fixed and flexible electrodes to maintain the flexible member in the position more closely adjacent the substrate. More particularly, the first magnitude may be greater than the second magnitude.

According to yet additional embodiments of the present invention, a valve assembly may include a main housing and first and second photo-lithographically fabricated valves. The main housing may define at least three chambers, with a first chamber configured to be coupled to a high pressure supply port, a second chamber configured to be coupled to an output port, and a third chamber configured to be coupled to a low pressure exhaust port. The first photo-lithographically fabricated valve may be provided between the first and second chambers, and the first photo-lithographically fabricated valve may allow or substantially block fluid communication between the first chamber and the second chamber responsive to a first electrical signal. The second photo-lithographically fabricated valve may be provided between the second and third chambers, and the second photo-lithographically fabricated valve may allow or substantially block fluid communication between the second chamber and the third chamber responsive to a second electrical signal.

According to some additional embodiments of the present invention, a method of forming a valve assembly may include photo-lithographically forming a first valve on a first substrate, and photo-lithographically forming a second valve on a second substrate. A main housing defining at least three chambers may be formed, with a first chamber configured to be coupled to a high pressure supply port, a second chamber configured to be coupled to an output port and a third chamber configured to be coupled to a low pressure exhaust port. The first valve may be placed between the first and second chambers so that the first valve allows or substantially blocks fluid communication between the first chamber and the second chamber responsive to a first electrical signal. The second valve may be placed between the second and third chambers so that the second valve allows or substantially blocks fluid communication between the second chamber and the third chamber responsive to a second electrical signal.

BRIEF DESCRIPTION OF THE DRAWINGS

FIG. 12 is a table illustrating logic relationships between inputs and outputs of custom circuits according to some embodiments of the present invention.

FIG. 13 is a table illustrating sequences for state transitions and polarity reversals according to some embodiments of the present invention.

FIGS. 14A and 14B are tables illustrating pin definitions for custom circuits according to some embodiments of the present invention.

FIGS. 15A and 15B are tables illustrating design parameters for custom circuits according to some embodiments of the present invention.

DETAILED DESCRIPTION

Figure 1:
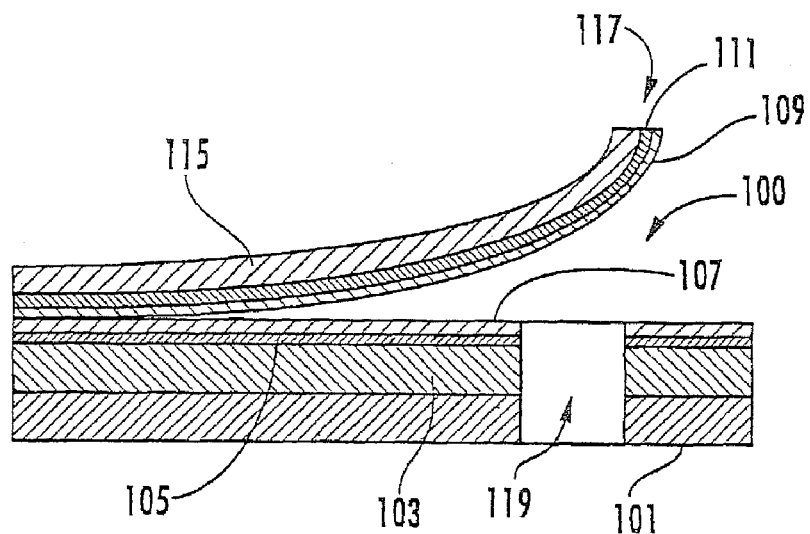
FIG. 1 is a cross-sectional view of an electro-statically actuated valve according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, thickness and/or widths of layers, regions, and/or lines are exaggerated for clarity. It will also be understood that when an element such as a layer, region or substrate is referred to as being on another element, it can be directly on the other element or intervening elements may also be present. In contrast, if an element such as a layer, region or substrate is referred to as being directly on another element, then no other intervening elements are present. Similarly, an element is referred to as being "connected to" or "coupled to" another element, it can be directly connected to or coupled to the other element or intervening elements may also be present. In contrast, when an element is referred to as being directly connected to or directly coupled to another element, then no other intervening elements are present. As used herein, the term and/or includes any and all combinations of one or more of the associated listed items.

Furthermore, relative terms, such as beneath, over, under, upper, and/or lower may be used herein to describe one element's relationship to another element as illustrated in the figures. It will be understood that relative terms are intended to encompass different orientations of the device in addition to the orientation depicted in the figures. For example, if the device in one of the figures is turned over, elements described as below other elements would then be oriented above the other elements. The exemplary term below, can therefore, encompasses both an orientation of above and below.

It will be understood that although the terms first and second are used herein to describe various regions, layers and/or sections, these regions, layers and/or sections should not be limited by these terms. These terms are only used to distinguish one region, layer or section from another region, layer or section. Thus, a first region, layer or section discussed below could be termed a second region, layer or section, and similarly, a second region, layer or section could be termed a first region, layer or section without departing from the teachings of the present invention. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In a pneumatic actuator, two actuator chambers are separated by a piston, and pressure differentials in the actuator chambers are used to move the piston. A rod can be used to transfer movement of the piston to a device being actuated outside the actuator. Valve assemblies according to embodiments of the present invention can be used to control air flow into and out of one or both actuator chambers of a pneumatic actuator.

Valve assemblies according to embodiments of the present invention may include a plurality of arrays of valves with each array of valves provided on a separate substrate. Each valve may include a valve orifice(s) through a substrate and an electrostatically actuated flexible valve flap used to gate the valve orifice(s). More particularly, each flexible valve flap may be anchored to the substrate at a first end and free at all other edges. In addition, the free end of each flexible valve flap may curl away from the substrate so that each flexible valve flap is normally open in the absence of an applied electro-static force. Valve flaps may be provided on a top surface of the substrate, and flow through an open valve orifice(s) may be from a high pressure on the bottom surface of the substrate to a low pressure on the top surface of the substrate.

The structure of an individual valve according to embodiments of the present invention is illustrated in FIG. 1. As shown in FIG. 1, the valve 100 may include a substrate 101 (such as a silicon substrate), a fixed electrode 105 provided between first and second insulating layers 103 and 107 on a top surface of the substrate 101, and a flexible electrode 111 provided between third and fourth insulating layers 109 and 115. The fixed and flexible electrodes 105 and 111, for example, may include a metal such as Ti, Cr, Au, Al, Cu, W, Pt, Ag, and/or another flexible conductive material such as a conductive polymer (e.g., polyanniline) and/or a conductive oxide (e.g., indium-tin-oxide ITO). With some conductive metal films (such as films of Au, Ag, Al, Cu, and/or Pt), a thin adhesion layer (such as a layer of Ti and/or Cr) may be provided on both upper and lower surfaces of the conductive metal film to improve adhesion to adjacent insulating layers of the flexible flap. One or more of the insulating layers 103, 107, 109, and 115 may be layers of a polymer material such as polyimide or a photosensitive polymer. In alternative embodiments, one of the second insulating layer 107 or the third insulating layer 109 may be omitted, and/or the first insulating layer 103 may be omitted. In addition or in an alternative, insulating layer 107 and/or insulating layer 109 may include a ceramic dielectric such as silicon oxide ($SiO_2$).

The third and fourth insulating layers 109 and 115 and the flexible electrode 111 define a flexible valve flap 117 adjacent a respective valve-orifice(s) 119 through the substrate 101. The valve may be formed by wet chemical etching and/or deep reactive ion etching through the substrate. The flexible valve flap 117 may be configured to curl away from the top surface of the substrate to a normally open position in the absence of an attractive electro-static force between the fixed and flexible electrodes 105 and 111 to allow fluid passage from a bottom surface of the substrate 101 through the valve-orifice(s) 119 and past the flexible valve flap 117 on the top surface of the substrate 101. The valve 100 may be closed by creating an attractive electro-static force between the fixed and flexible electrodes 105 and 111 so that the flexible valve flap 117 blocks the valve orifice(s) 119. More particularly, the valve flap 117 can be made to curl to the normally open position away from the top of the substrate 101 by fabricating the insulating layers 109 and 115 to have predetermined stresses therein. Microelectromechanical electrostatic valve devices are discussed, for example, in U.S. Pat. No. 6,590,267 to Scott H. Goodwin-Johansson et al., entitled "*Microelectromechanical Flexible Membrane Electrostatic Valve Devices And Related Fabrication Methods*"; U.S. Pat. No. 6,236,491 to Scott H. Goodwin-Johansson et al., entitled *Micromachined Electrostatic Actuator With Air Gap*"; and/or International Publication No. WO 02/22492. The disclosures of each of these patents and publications is hereby incorporated herein in its entirety by reference. Electro-statically actuated valves may be provided according to embodiments of the present invention using flexible valve flaps as discussed above with respect to FIG. 1 or using other moveable valve members such as micromachined diaphragms.

Figure 2:
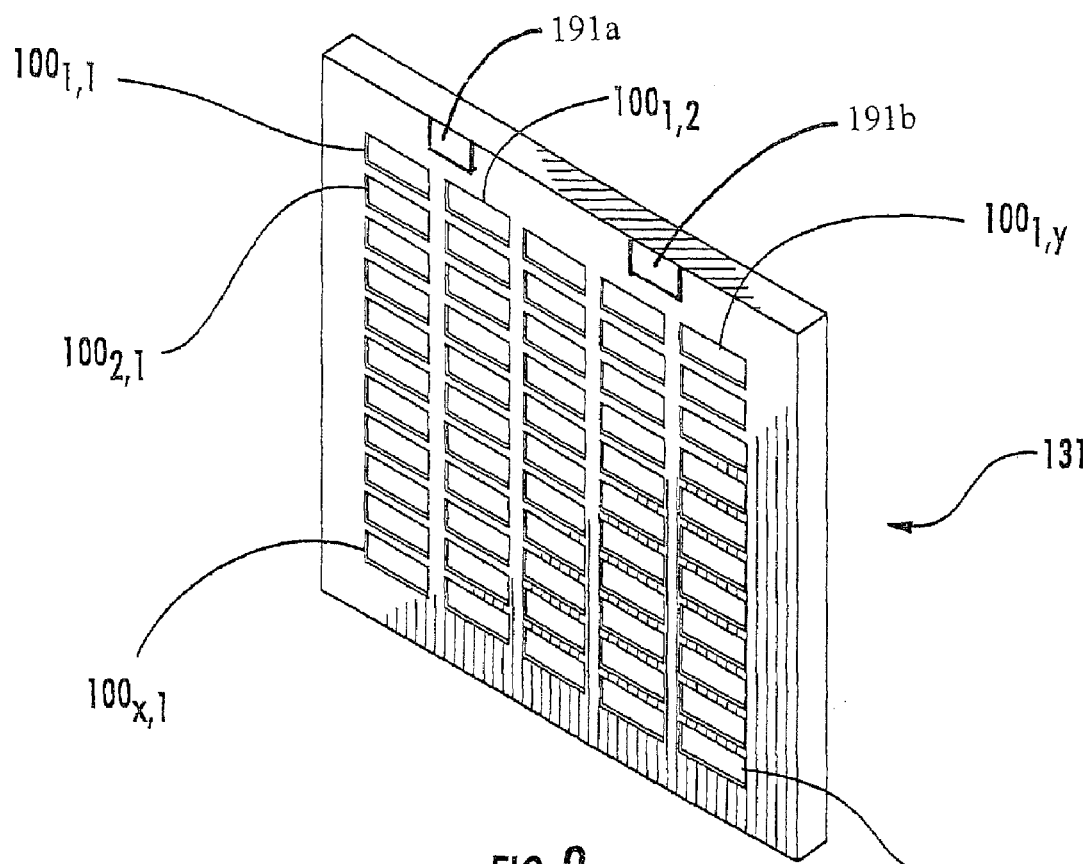
FIG. 2 is a plan view of a valve chip including an array of electro-statically actuated valves according to embodiments of the present invention.

An array of valves $100_{1-x,1-y}$ may be provided on the top surface of a single substrate to provide the valve chip 131 shown in FIG. 2. As shown in FIG. 2, a plurality of valves $100_{1-x,1-y}$ may be arranged in rows and columns on the chip 131, with each valve $100_{1-x,1-y}$ including a respective valve orifice(s) 119 (or hole(s)) and flexible valve flap 117 (as shown in FIG. 1). Moreover, the fixed electrodes 105 of each valve $100_{1-x,1-y}$ on the valve chip 131 may be electrically connected to each other, and the flexible electrodes 111 of each valve $100_{1-x,1-y}$ on the chip 131 may be electrically connected to each other so that a voltage potential can be provided between the fixed and flexible electrodes to create an electro-static attraction there between. While a plurality of valves (with each valve including one valve flap and one orifice) are illustrated in FIG. 2, other arrangements may be provided for valve chips according to embodiments of the present invention. For example, a valve chip according to some embodiments of the present invention may include a single valve with a single valve flap and a single orifice. In an alternative, a valve chip according to other embodiments of the present invention may include one or more valves with at least one valve including a single valve flap used to open and close a plurality of orifices.

More particularly, the arrays of valves can be formed on the substrate using photo-lithographic mask and etch techniques, and the substrate may comprise a material such as silicon, glass, and/or quartz. For example, flexible valve flaps may be photo-lithographically formed on respective sacrificial layers, and the sacrificial layers can then be removed (using an etch, for example) to release flexible valve flaps allowing the valve flaps to curl away from the substrate. Moreover, a plurality of valve chips may be fabricated on a common wafer and then separated.

Accordingly, the array of valves $100_{1-x,1-y}$ can be opened and closed in unison. More particularly, a closing electrical potential can be applied between the fixed electrodes 105 of the array and the flexible electrodes 111 of the array to create an attractive electro-static force so that all of the flexible valve flaps 117 close all of the valve orifices 119 on the valve chip 131. Similarly, an opening electrical potential can be applied between the fixed electrodes 105 of the array and the flexible electrodes 111 to remove the attractive electro-static force so that all of the flexible valve flaps 117 open all of the valve orifices 119 on the chip 131. By providing the array of commonly actuated valves $100_{1-x,1-y}$ on the chip 131, the valve chip 131 can regulate a greater flow of fluid than would otherwise be possible with a single valve. Valve chips of different flow sizes (Cv) may thus be provided with flow sizes of up to 10 Cv. Flow sizes, for example, in the range of approximately 0.001 Cv to approximately 10 Cv may be provided. Flow sizes may be determined, for example, by a number of valves, a size of valve orifices, etc. A larger valve chip may thus provide a greater flow size. In an alternative, valves and/or groups of valves could be individually addressed and operated separately.

Moreover, the valve chip 131 may be packaged before releasing the valve flaps 117. More particularly, the valve flaps 117 may be formed on a sacrificial oxide, and the sacrificial oxide may be maintained while the valve chip 131 is being assembled in a packaging frame. The sacrificial oxide may then be removed using a dry (vapor) HF (hydrofluoric acid) release without significantly damaging the packaging frame. More particularly, the packaging frame may be formed of viton and/or other materials which may be resistant to damage from a dry (vapor) HF release. While sacrificial oxide layers are discussed herein by way of example, other sacrificial layers (such as sacrificial metal layers) may be used with other suitable vapor or wet chemical etchants.

In an alternative, valve flaps of a valve chip may be released by removing the sacrificial oxide using a wet HF acid etch either before dicing from a wafer including a plurality of valve chips, after dicing but before packaging, or after packaging. More particularly, the sacrificial oxide layer may be removed from the valve chip using a 49% HF solution for approximately 10 minutes, and the wet etch may be followed by a de-ionized (DI) water rinse, an isopropyl alcohol rinse, and first and second methanol rinses for 20 minutes each to remove any residual HF and/or water. After the wet processing, the valve chip with the released valve flaps may be primed with methanol for a supercritical dry cycle to reduce any surface tension that may otherwise result in stiction between valve flaps and the substrate.

More particularly, the valve chip may be loaded into a dryer chamber and covered with methanol, and liquid $CO_2$ may then be used to displace the methanol from the chamber at a pressure of approximately 1200 psig. Once all of the methanol is displaced, the chamber is heated past the supercritical point (approximately 31 degrees C.) to transition the $CO_2$ from the liquid to gas phase, and the pressure may be released to vent the system of $CO_2$ vapor. Because supercritical $CO_2$ has extremely low surface tension, $CO_2$ is less likely to pull the valve flaps down as it transitions from liquid to gas. Commercially available and/or custom supercritical dryers may be used.

Visual inspection can be used to determine that an acceptable number of the valve flaps on a valve chip are successfully released. In particular, a surface of the valve chip has a different color than exposed silicon under the flaps which is visible when the valve flaps are released and the valve chip is unpowered, and the color variations could be inspected. In an alternative, light can be projected through the wafer after release, and an optical detector could detect light differences between the powered (closed) and unpowered (open) valve chip. In either example, machine vision systems could be used to perform the inspections. Packaging for valve chips 131 is discussed in greater detail in U.S. Utility application No. 11/188,294 to William O. Teach et al., entitled "*Microvalve Assemblies And Related Methods*" filed concurrently herewith (hereinafter "Teach et al."). The disclosure of Teach et al. is hereby incorporated herein in its entirety by reference.

Figure 3:
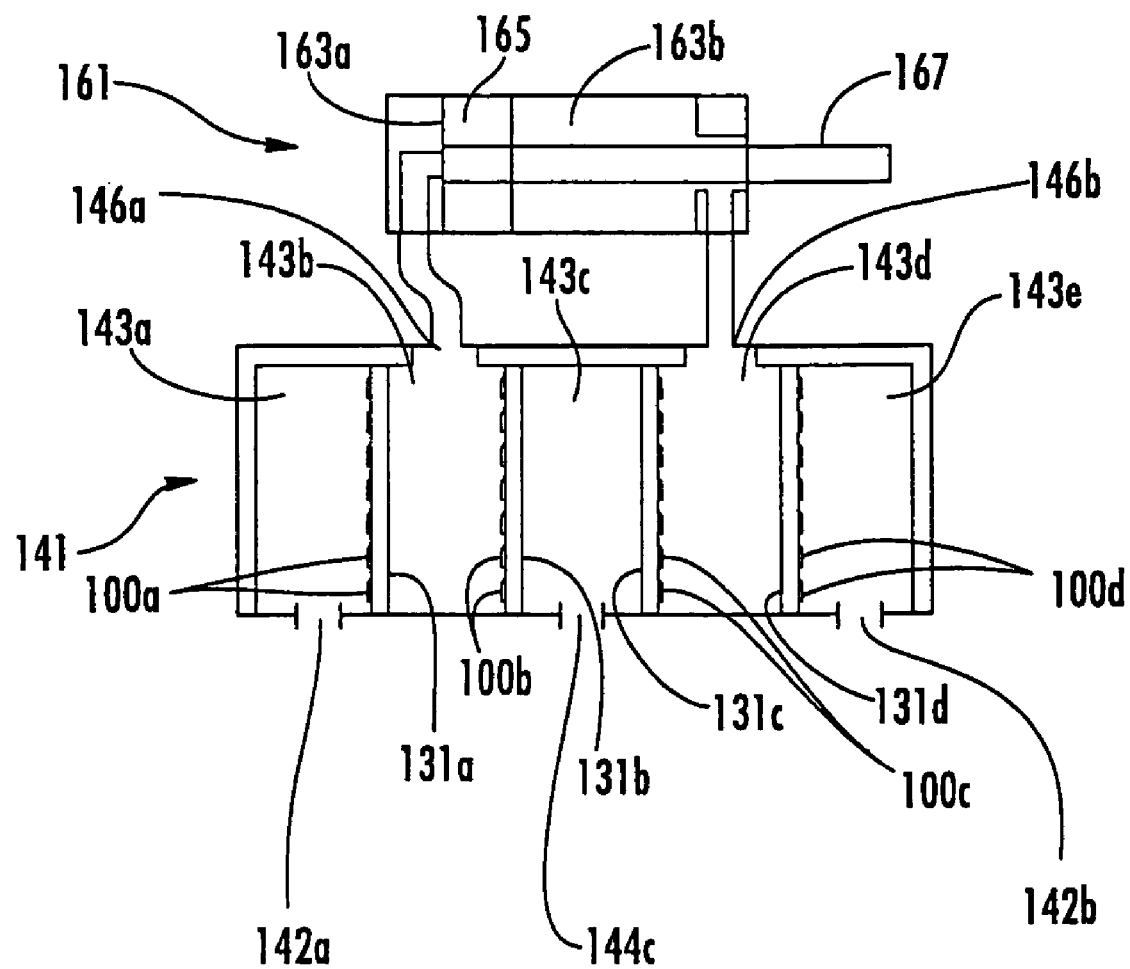
FIG. 3 is a schematic diagram of a valve assembly according to embodiments of the present invention, controlling a pneumatic actuator.

A schematic diagram of valve assemblies 141 according to embodiments of the present invention is illustrated in FIG. 3. As shown in FIG. 3, four valve chips 131*a-d* separate five chambers 143*a-e* of the valve assembly 141. More particularly, valve chip 131*a* separates chambers 143*a* and 143*b*; valve chip 131*b* separates chambers 143*b* and 143*c*; valve chip 131*c* separates chambers 143*c* and 143*d*; and valve chip 131*d* separates chambers 143*d* and 143*e*. The chambers 143*a* and 143*e* are coupled to respective low pressure exhaust ports 142*a* and 142*b*; the chambers 143*b* and 143*d* are coupled through ports 146*a* and 146*b* (also referred to as output ports) to respective chambers 163*a* and 163*b* (separated by moveable piston 165) of the pneumatic actuator 161; and the chamber 143*c* is coupled to a high pressure supply port 144*c*. Accordingly, the valve chip 131*a* is configured to allow or block fluid flow from chamber 143*b* to chamber 143*a*. The valve chip 131*b* is configured to allow or block fluid flow from chamber 143*c* to chamber 143*b*. The valve chip 131*c* is configured to allow or block fluid flow from chamber 143*c* to chamber 143*d*. The valve chip 131*d* is configured to allow or block fluid flow from chamber 143*d* to chamber 143*e*.

According to some embodiments of the present invention, the valve assembly 141 and the pneumatic actuator 161 (also referred to as a cylinder) may be produced separately and then coupled together. A customer may thus separately purchase valve assemblies and pneumatic actuators from the same or different vendors. According to other embodiments of the present invention, the valve assembly may be embedded (or integrated) in the pneumatic actuator so that the two are produced as one unit.

Sequential conditions of operation of the valve assembly 141 of FIG. 3 are discussed in greater detail below with respect to FIGS. 4A-F. In one possible startup condition illustrated in FIG. 4A, valve flaps of all valves 100a-d on the valve chips 131a-d are closed in a first condition at startup. The valves are maintained closed by applying attractive electro-static forces to the valve flaps of the valves. In this startup condition, there is gauge pressure in the supply chamber 143c only, and there is no gauge pressure in any of the other chambers 143a-b and 143d-e. During operations after startup, gauge pressure will be present in the supply chamber 143c and at least one of chambers 143b or 143d. The piston 165 and rod 167 are shown in the retracted position at startup by way of example.

Figure 4A:
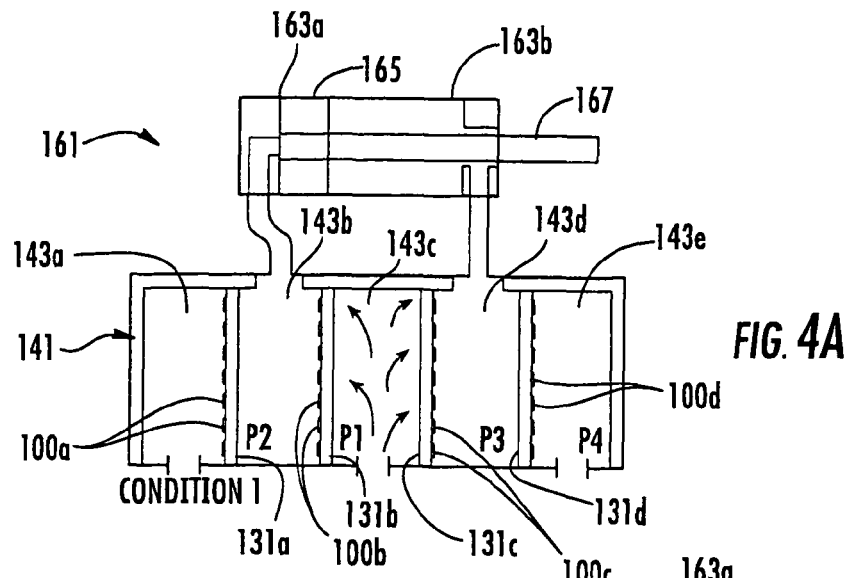
FIGS. 4A-F are schematic diagrams illustrating sequences of operations of valve assemblies according to embodiments of the present invention.
Figure 4B:
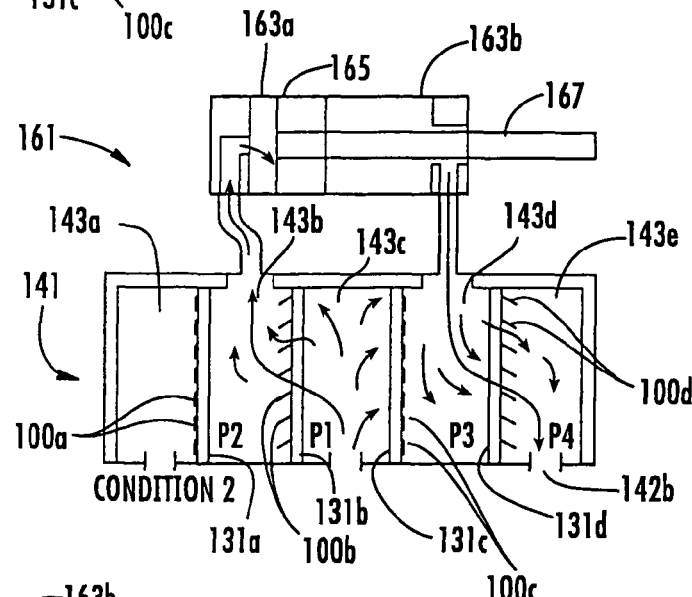

In a second condition of FIG. 4B, valve flaps of valves 100b and 100d on valve chips 131b and 131d are opened while valve flaps on valves 100a and 100c of valve chips 131a and 131c are closed. Because of the pressure differentials from chamber 143c to 143b and from chamber 143d to 143e, valve flaps of valves 100a and 100c can be opened by reducing/eliminating attractive electro-static forces applied thereto so that the valve flaps curl to the normally open position. Accordingly, the pressure of chambers 143b and 163a rises, the piston 165 and rod 167 extend, and chambers 163b and 143d are exhausted through chamber 143e and exhaust port 142b.

Figure 4C:
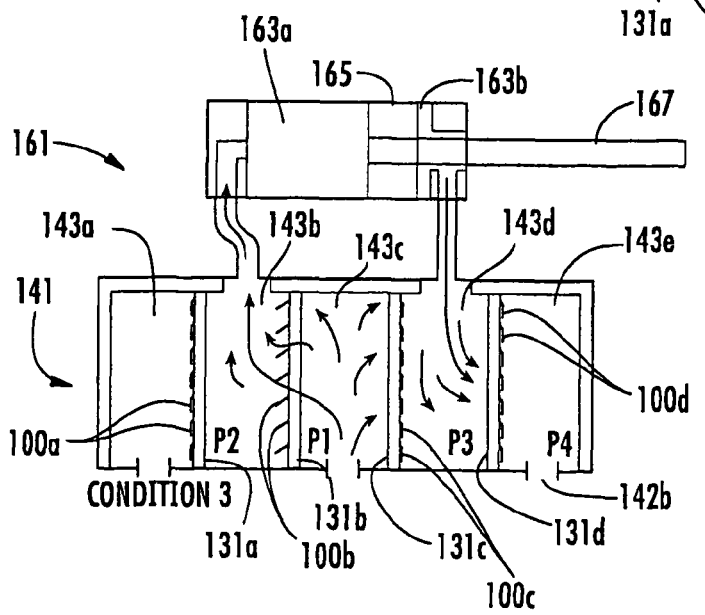
Figure 4D:
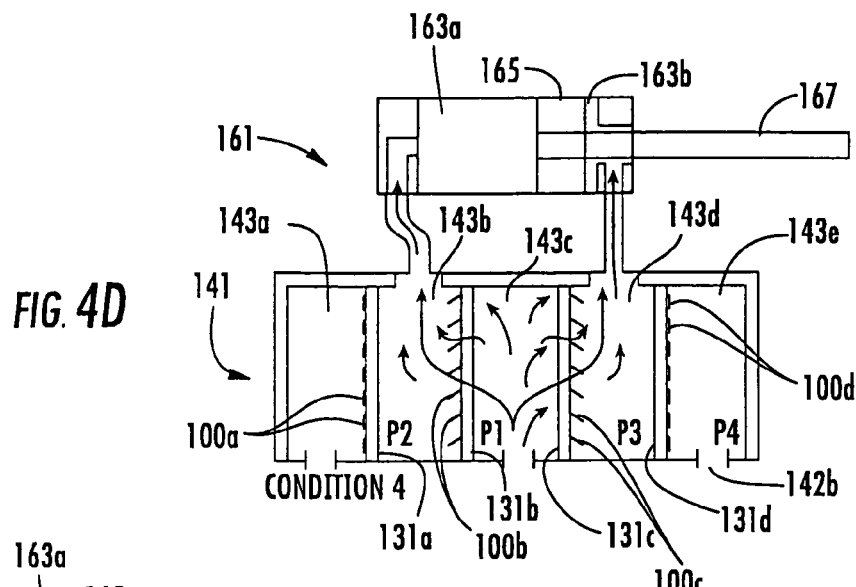

In a third condition of FIG. 4C, a sufficient equilibrium between the pressures of chambers 143d and 143e may be achieved so that the valve flaps of valves 100d of valve chip 131d can be closed, and an attractive electro-static force on the valve flaps is used to close the valves 100d of valve chip 131d. In a fourth condition of FIG. 4D, valve flaps of valves 100c can be opened because chamber 143d was previously exhausted in the condition of FIG. 4C. An electro-static force used to close valve flaps of valves 100c is removed so that valves 100c are opened as valve flaps thereof curl to the normally open position as shown in FIG. 4D while the valves 100b are maintained open. By opening valves 100c before the piston 165 is fully extended, an increasing pressure in chambers 143d and 163b may slow the piston motion.

Figure 4E:
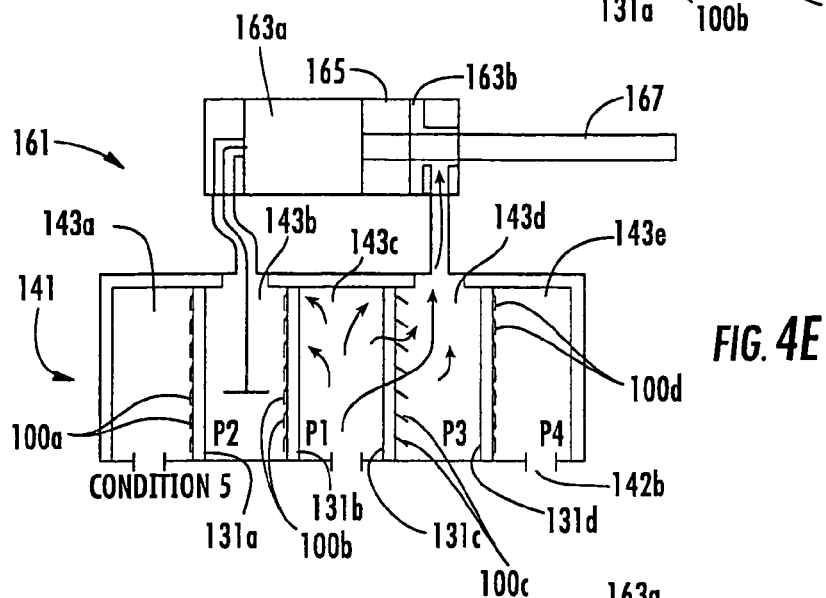

In a fifth condition of FIG. 4E, an equilibrium can be achieved between chambers 143b and 143c and the valve flaps of valves 100b on valve chip 131b can be closed by applying an attractive electro-static force. Moreover, a pressure of chamber 143b can be increased relative to that of chamber 143a.

Figure 4F:
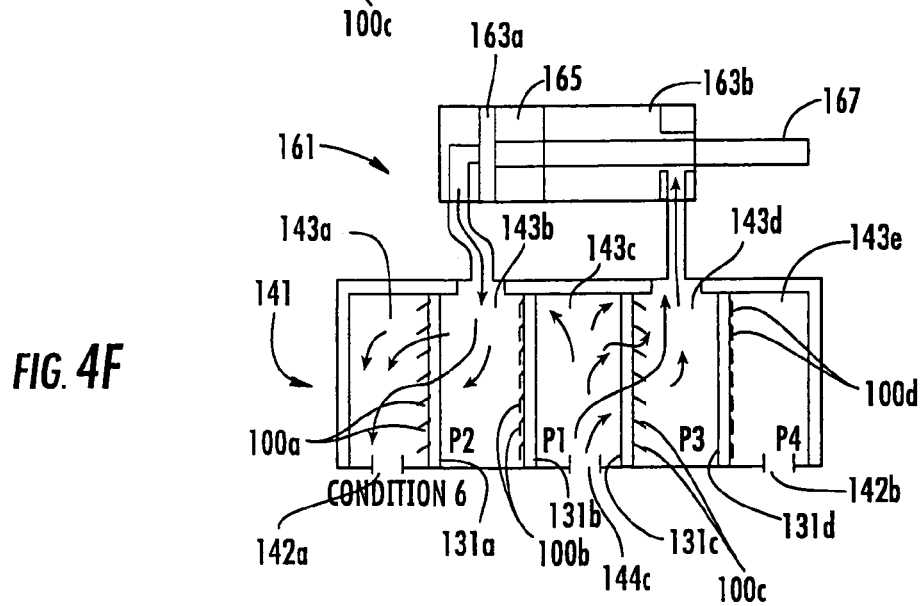

In a sixth condition of FIG. 4F after increasing a pressure of chamber 143b relative to that of chamber 143a, the valve flaps of valves 100a on valve chip 131a can be opened by removing an electro-static force used to close the valve flaps of valves 100a so that the valve flaps curl to the normally open position. Accordingly, the pneumatic actuator chamber 163a is coupled to low pressure exhaust port 142a through chambers 143a and 143b, and the pneumatic actuator chamber 163b is coupled to high pressure supply port 144c through chambers 143c and 143d. In the condition of FIG. 4F, the piston 165 and rod 167 retract. Once pressures in chambers 143c and 143d equalize and pressures in chambers 143a and 143b equalize, the valves 100a and 100c of valve chips 131a and 131c can be closed by applying attractive electro-static forces to the valve flaps thereof and operations of FIGS. 4A-4F can be repeated to extend and retract the piston 165 and rod 167.

The valve chips 131a-d of the valve assembly 141 may sequence through the conditions of FIG. 4B to FIG. 4C to FIG. 4D to FIG. 4E to FIG. 4F to move the piston 165 and rod 167 from a retracted position to an extended position. The valve chips 131a-d of the valve assembly 141 may sequence through the conditions of FIG. 4F to FIG. 4E to FIG. 4D to FIG. 4C to FIG. 4B to move the piston 165 and rod 167 from an extended position to a retracted position. Operations of the valve assembly 141 are discussed in Teach et al., the disclosure of which is hereby incorporated herein in its entirety by reference.

Sequencing operations discussed above with respect to FIGS. 4A-F may thus be used to extend and retract the piston 165. It will be understood, however, that not every command to extend the piston will result in extension or complete extension of the piston, and that not every command to retract the piston will result in retraction or complete retraction. For example, a next command may be received/initiated before a previous extension/retraction has been completed. More particularly, a next command may be received/initiated before a previous extension/retraction has been completed, for example, if a fault condition is detected, if a safety sensor is tripped, and/or if a power outage is detected.

Sequencing techniques discussed above with respect to FIGS. 4A-F may increase a maximum pressure against which the valve assembly can operate to extend and retract the actuator. Any inherent operational restrictions to opening the valves in an array can be reduced because a higher pressure is present on the bottom surfaces of the valve chips. Restrictions may occur when closing a valve with a force from air pressure approximating an electro-static closing force of the valve. The valves may thus be selectively opened and closed to allow reduction of pressure differentials between adjacent chambers. By reducing pressure differentials between adjacent chambers, a condition can be created whereby valve flaps of a valve chip can be closed against a significantly lower pressure differential than was originally present. A relatively small delay of time (for example, in the range of about 100 microseconds to about 200 microseconds based on the chamber size) may be sufficient to reduce the pressure differential when closing valve flaps of a valve chip in a state where a relatively high pressure differential may have otherwise been present.

Figure 5:
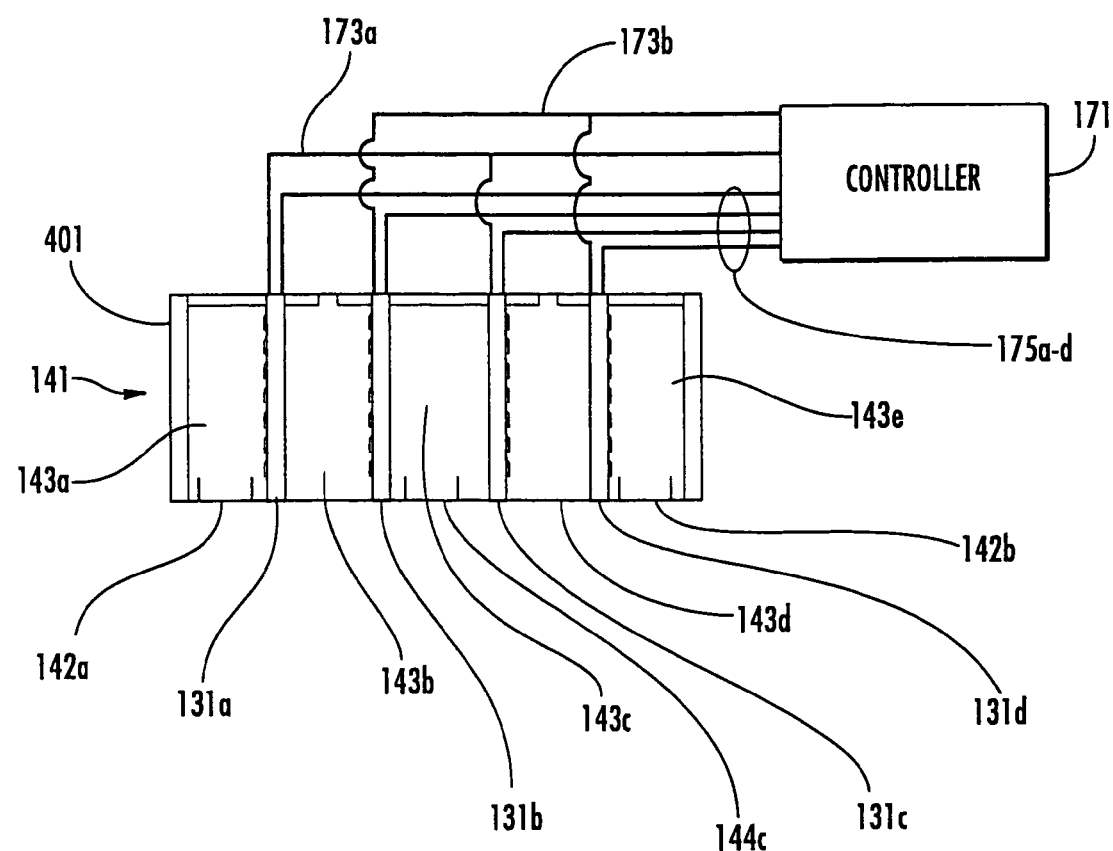
FIG. 5 is a schematic diagram of a valve assembly including a controller and leads used to operate valve chips according to embodiments of the present invention.

As discussed above, a valve chip 131 may include a plurality of electro-statically actuated valves thereon. Moreover, all of the fixed electrodes on the valve chip 131 may be electrically connected to a first input pad 191a, and all of the flexible electrodes on the valve chip may be electrically connected to a second input pad 191b. Accordingly, electrical signals from a controller 171 may be coupled to the first and second input pads 191a and 191b of each valve chip to open and close all of the valves on the valve chip in unison. The schematic diagram of FIG. 5 shows a valve assembly including four valve chips 131a-d separating five valve chambers 143a-e and a controller 171 used to control operations of the valve chips 131a-d according to embodiments of the present invention. Operations of the valve assembly are discussed above, for example, with reference to FIGS. 3 and 4A-F.

Packaging frames for valve chips, packaged valve chips, valve assemblies including packaged valve chips, and electronic sub-assemblies used to control valve assemblies are discussed in Teach et al., the disclosure of which is hereby incorporated herein in its entirety by reference. Operations of controllers according to embodiments of the present invention may be implemented in an electronics sub-assembly, for example, as discussed in Teach et al. Additional operations of controllers according to embodiments of the present invention are discussed below with respect to FIGS. 10-15.

A same reference lead may provide an electrical coupling between the controller 171 and one input pad on each valve chip 131a-d. Separate signal leads 175a-d provide separate electrical couplings between the other input pad on each valve chip 131a-d and the controller 171. A separate reference lead may be provided for each valve chip 131a-d or one or more reference leads may be shared by more than one valve chip. According to particular embodiments discussed below with respect to FIG. 5, a first reference lead 173a may be coupled between the controller 171 and valve chips 131a and 131c, and a second reference lead 173b may be coupled between controller 171 and valve chips 131b and 131d.

Functionality of controller 171 may be implemented, for example, in an electronics sub-assembly as discussed in Teach et al. Accordingly, the controller 171 may separately control each of the valve chips 131a-d to provide operations such as operations discussed with respect to FIGS. 4A-F. Moreover, a housing 401 of the valve assembly 141 may be formed of injection molded insulating material (such as a plastic material, an elastomeric material, a polymer, a co-polymer, and/or derivatives thereof) with the leads 173 and 175a-d being insert molded therein as discussed, for example, in Teach et al. Moreover, electronics of the controller 171 may be implemented in whole or in part using a custom circuit(s) (for example, including one or more application specific integrated circuit [ASIC] devices) as discussed, for example, below with respect to FIGS. 10-15.

By applying a relatively high voltage (such as 100 Volts or higher) across the input pads of a valve chip, the normally open valve flaps may be closed due to electro-static attraction between the fixed and flexible electrodes (provided that fluid pressures are substantially equalized on both sides of the valve chip when the voltage is applied). Depending on a particular operation(s) being performed, valve flaps on a valve chip may be closed for significant lengths of time resulting in charge build-up. For example, equipment including the valve assembly may be shut down over night so that a valve chip is closed for 8 to 16 hours with the associated actuator being maintained in the same position during that time. Shorter periods may also result in charge build-up.

If valve flaps of a valve chip are closed for a significant period of time with a relatively high voltage (such as 100 Volts) applied between the fixed and flexible electrodes thereof, charge build up may occur at a dielectric-metal interface, and the valve flaps may not immediately open when the voltage potential between the fixed and flexible electrodes is removed. With reference to FIG. 1, charge build-up may occur at an interface between the flexible electrode 111 and the dielectric layer 109 and/or between the fixed electrode 105 and the dielectric layer 107 when the flexible valve flap 117 is closed against the valve orifice 119 for a significant period of time due to an electro-static force generated by a voltage potential applied between the fixed electrode 105 and the flexible electrode 111. With sufficient charge build-up, inherent stresses in the flexible valve flap 117 may be insufficient to generate enough force to overcome electro-static forces resulting from the charge build-up until the charge has sufficient time to dissipate from the dielectric-metal interface(s). Such a charge build-up condition may cause the flexible valve flap to remain closed over the orifice even though the externally applied voltage difference is no longer being applied to the fixed and flexible electrodes.

Accordingly, when a valve chip is maintained closed, the controller 171 of FIG. 5 may be configured to reduce a charge build-up at metal-dielectric interfaces of valves on the valve chip. According to embodiments of the present invention, the controller 171 may periodically reverse the polarity of the leads driving a valve chip that is being maintained closed. If the valve chip 131a is being maintained closed, for example, the polarity of the signal lead 175a may be reversed periodically with respect to the associated reference lead 173a to reduce charge build-up. In an alternative, the controller 171 may detect a charge build-up and initiate a polarity reversing operation upon detecting a predetermined level of charge build-up.

When reversing the polarity of leads driving a valve chip, power may be removed from the leads before reversing polarity. For example, the power may be removed for a sufficiently brief period of time (for example, on the order of 1 microsecond) before applying the reverse polarity that the valve flaps of the valve chip do not have time to open before the reversed polarity is applied. In an alternative, the valve flaps may open or begin to open during the time that the power is removed before the reversed polarity is applied, but the reverse polarity may be applied sufficiently quickly thereafter that any fluid flow through the valve chip is not significant with respect to operation of the valve assembly 141. In other words, fluid flow during the period of time without power before the reversed polarity is applied may result in insignificant movement of a pneumatic actuator being controlled by the valve assembly 141. The time required to open and close the flexible valve flap may be on the order of 100 microseconds. Other controller functions may be applied to reduce charge build up including removing voltage, applying short high frequency voltage cycles, and then reapplying voltage to maintain the closed flexible flap.

According to particular embodiments of the present invention, a valve assembly may be maintained in a particular condition such as illustrated in FIG. 4B and/or FIG. 4F for a sufficiently long period of time so that the closed valve chips may experience charge build-up. For example, the valve assembly may have valve chips 131a and 131c closed as illustrated in FIG. 4B, and this condition may be maintained with the piston 165 and rod 167 extended. Moreover, the first reference lead 173a may be coupled between the controller 171 and the valve chips 131a and 131c, and the second reference lead 173b may be coupled between the controller 171 and the valve chips 131b and 131d. Accordingly, it may be necessary to reverse polarity of signals applied to both of valve chips 131a and 131c at the same time.

More particularly, it may be desirable to: (1) rapidly sequence through the operational conditions of FIGS. 4B, 4C, 4D, and 4E to the condition of FIG. 4F; (2) reverse polarities of the leads driving valve chips 131a and 131c; and then (3) rapidly sequence back through the conditions of FIGS. 4E, 4D, and 4C to the condition of FIG. 4B. By sequencing to the condition of FIG. 4F, power is cut off to both valve chips 131a and 131c so that the polarity of the leads for these chips can be reversed. By quickly sequencing through the conditions from that of FIG. 4B to that of FIG. 4F and back again, sufficient pressure equalization can be achieved in valve chambers 143a-e so that the valves of valve chips 131a and 131c can be opened and closed without generating significant movement of the extended piston 165 or rod 167. Because the volumes of the valve chambers 143a-e may be small relative to the volumes of the actuator chambers 163a-b, because restrictions may be present through couplings between valve chambers 143b and 143d and actuator chambers 163a-b, and/or because only partial equalization between adjacent valve chambers may be required to allow closure of a valve chip there between, the forward and reverse sequences of FIGS. 4B-4F may be performed quickly without resulting in significant motion of the extended piston 165 and rod 167.

In another example, the valve assembly may have valve chips 131b and 131d closed as illustrated in FIG. 4F, and this condition may be maintained with the piston 165 and rod 167 retracted. Moreover, the reference lead 173b may be coupled between the controller and the valve chips 131b and 131d, and the reference lead 173a may be coupled between the controller and the valve chips 131a and 131c. Accordingly, it may be necessary to reverse polarity of signals applied to both of valve chips 131b and 131d at the same time.

More particularly, it may be desirable to: (1) rapidly sequence through the operational conditions of FIGS. 4F, 4E, 4D, and 4C to the condition of FIG. 4B; (2) reverse polarities of the leads driving valve chips 131b and 131d; and then (3) rapidly sequence back through the conditions of FIGS. 4C, 4D, and 4E to the condition of FIG. 4F. By sequencing to the condition of FIG. 4B, a condition is reached where power is cut off to both valve chips 131b and 131d so that the polarity of the leads for these chips can be reversed. By quickly sequencing through the conditions from that of FIG. 4F to that of FIG. 4B and back again, sufficient pressure equalization can be achieved in valve chambers 143a-e so that the valves of valve chips 131b and 131d can be opened and closed without generating significant movement of the retracted piston 165 or rod 167. Because the volumes of the valve chambers 143a-e may be small relative to the volumes of the actuator chambers 163a-b, because there are restrictions through couplings between valve chambers 143b and 143d and actuator chambers 163a-b, and/or because only partial equalization between adjacent valve chambers may be required to allow closure of a valve chip there between, the reverse and forward sequences of FIGS. 4F-4B may be performed quickly without resulting in significant motion of the retracted piston 165 and rod 167.

In addition, wave shaping of signals used to drive the valve chips may be used to lower an average power consumed. For example, a "pull-in" current and/or voltage required to close valve flaps of a valve chip may be greater than a "hold" current and/or voltage required to hold valve flaps of a valve chip closed. Accordingly, a greater "pull-in" voltage potential (such as on the order of 100 Volts or higher) may be applied to a valve chip to initiate closing of open valve flaps, and a lesser "hold" voltage potential (such as on the order of 50 Volts) may be applied to the valve chip to hold the valve flaps once closed. According to particular embodiments, a signal overshoot and settling phenomena may be used to achieve an initially higher "pull-in" current and/or voltage followed by a significantly lower "hold" current and/or voltage. By using a lower "hold" current, charge build-up at metal-dielectric interfaces may be reduced. The controller 171 may include a push/pull device and/or an amplifier to provide wave shaping according to embodiments of the present invention.

Charge build-up may be reduced by reducing a voltage used to close and/or hold a valve flap. As discussed above, wave shaping may be used so that a relatively high "pull-in" voltage is used to close valves on a valve chip, and a relatively low "hold" voltage is used to maintain the valves of the valve chip closed. By reducing the "hold" voltage, charge build-up can be reduced during periods when the valves of a valve chip are maintained closed. Moreover, "pull-in" voltages used to close valves and "hold" voltages used to maintain valves closed may be reduced by reducing thickness of one or both of dielectric layers 107 and/or 109 so that pull-in and/or holding forces can be generated using lower voltages generated across the narrower space between the fixed and flexible electrodes. Thinner dielectric layers using materials having improved breakdown characteristics may thus be used.

In addition, a power supply such as a battery, capacitor, and/or fuel cell may be used with the controller 171 as a primary and/or backup power source for the valve assembly. As compared with conventional solenoid based systems, a valve assembly 141 using valve chips 131a-d may have relatively low power requirements so that a power source such as a battery, capacitor, and/or fuel cell may be sufficient. For example, backup power may be provided for the controller 171 using a rechargeable lithium or lithium ion battery, and the lithium or lithium ion battery may be recharged during normal operations using a primary external power source. A lithium battery may provide relatively high energy density, reliability, and/or voltage output (for example, 3 Volt DC). A lithium battery may also provide operation over a wide range of temperatures with very little change over that range. In addition, a lithium battery may provide relatively long life and/or long shelf life.

In the valve assembly of FIGS. 3, 4, and 5, a peak power/current demand may be reduced by sequentially turning on and off devices using power. More particularly, when closing a valve chip, a greatest power may be consumed when initially closing the open valve chip, and a lower power may be consumed maintaining a valve chip closed. In the sequence of FIGS. 4B-F, for example, no two valve chips are closed during the same transition. If a transition involves closing two valve chips, the closing of the two valve chips may be slightly staggered so that one valve chip is closed before the other.

As discussed above, wave shaping may be used to reduce charge build-up. In addition, waveform shaping may be used to reduce an average operating power consumed by using a first voltage potential to close an open valve chip and then using a reduced voltage potential to maintain the valve chip closed. The controller may also provide a low power system state in the event of a loss of primary power so that a life of a backup power source may be extended. More particularly, all but the most essential circuits may be shut down during loss of the primary power source. For example, once the valve assembly reaches a predetermined default condition during a power outage, the controller may shut down all functionality except that required to maintain the valve assembly in the default condition.

According to particular embodiments of the present invention, an external primary power source may provide the controller 171 with a voltage potential of approximately 24 Volts, and a backup power source (such as a battery) may provide a voltage potential of approximately 3 Volts. Accordingly, the controller 171 may include a high power generation circuit to generate relatively high voltage signals used to drive the valve chips. The high power generation circuit, for example, may include a transistor driving a coil and/or transformer, and the coil and/or transformer may be discrete. Moreover, an efficiency of the high power generation circuit may be increased using one or more capacitors to either create and/or store the relatively high voltage potential. For example, and transistor and coil may be used to charge a capacitor (or capacitors if implemented as a bipolar supply). The capacitor(s) can provide the power source used to drive the valve chips, and sufficient charge may be stored on the capacitor(s) that backup power may be provided without requiring a battery. In addition or in an alternative, the high voltage signals used to drive the valve chips may be generated using a charge pump, an inductor circuit, and/or combinations thereof, and/or other circuits known to those having skill in the art.

Power scavenging techniques may also be used to generate power for operation of the controller 171. More particularly, power may be collected from any number of environmental sources, converted to electricity, and stored within a power storage device (such as a battery, capacitor, inductor, and/or fuel cell) to provide power for the controller 171. For example, light, heat, mechanical vibration, etc. may be converted to electrical power that is stored in a battery, capacitor, and/or inductor. In addition or in an alternative, emissions (such as alpha and/or beta emissions) from a radio isotope may be captured to provide electrical power that is stored in a battery, capacitor, and/or inductor. Accordingly, a separate electrical power supply may not be required. Moreover, a primary external power supply may be used to power the valve assembly and to charge a rechargeable backup power supply (such as a battery, capacitor, and/or inductor) of the controller. On interruption of the primary external power supply, the valve assembly may be powered from the rechargeable backup power supply.

The controller 171 of FIG. 5 may thus be configured to operate the valve chips 131*a-d* to control a position of a piston and rod of a pneumatic actuator coupled thereto as shown, for example, in FIGS. 3 and 4A-F. In addition, opening and/or closing of valves on valve chips 131*a-d* may be modulated to provide that further control of piston velocity, acceleration, and/or position. As used herein, the term modulate means that a valve chip is operated to provide different resistances to flow between a maximum resistance to flow (i.e., the valve is fully closed) and a minimum resistance to flow (i.e., the valve is fully open).

For example, the controller 171 may provide that an open valve is pulse width modulated (PWM) at a PWM modulation frequency (i.e., opened and closed at a duty cycle) to meter fluid flow through the valve. A maximum flow and/or a minimum flow resistance through a valve may be provided with a 100% open duty cycle, substantially no flow and/or a maximum flow resistance may be provided with a 0% open duty cycle, and duty cycles between 0% open and 100% open at the PWM modulation frequency may provide different intermediate flows and/or resistances to flow.

In an alternative, the controller 171 may provide different voltage differentials to a valve chip to provide different resistances to flow. For example, a high voltage differential may be provided to close a valve (i.e., to provide a maximum resistance to flow), a low voltage differential may be provided to open a valve (i.e., to provide a minimum resistance to flow), and a plurality of intermediate voltage differentials may provide different intermediate flows and/or resistances to flow. In other words, increasing voltage differentials may be provided between the fixed and flexible electrodes of the electro-statically actuated valves to provide increasing resistances to flow as the increasing voltage differentials pull the valve flaps closer to the substrate.

In another alternative, different valve flaps on a same valve chip may have different geometries so that different valve flaps close at different voltage potentials. Accordingly, a first group of valves may close responsive to a first closing voltage; a second group of valves and the first group of valves may close responsive to a second closing voltage greater than the fist closing voltage; and a third group of valves and the first and second groups of valves may all close responsive to a third closing voltage greater than the first and second closing voltages.

In another alternative, each valve chip may include separately addressable valve flaps so that the controller 171 can selectively open and/or close different numbers of valve flaps on a same valve chip at different times. For example, all valve flaps on a valve may be closed (i.e., to provide a maximum resistance to flow), all valve flaps on a valve chip may be opened (i.e., to provide a minimum resistance to flow), and intermediate numbers of valve flaps may be opened and/or closed to provide different intermediate flows and/or resistances to flow.

Valve modulation can thus be used to control velocity, acceleration, and/or position of a piston 167. With respect to FIG. 4B, for example, the valve chips 131*b* and 131*d* may be opened to move the piston 167 from a retracted position to an extended position. In some embodiments of the present invention, opening of one or both of the valve chips 131*b* and 131*d* may be modulated so that a first resistance to flow is provided during a first portion of the piston movement and so that a second resistance to flow is provided during a second portion of the piston movement. For example, a flow resistance provided by the valve chip 131*b* may be increased after the piston 167 begins extending to provide that a maximum velocity is not exceeded. In addition or in an alternative, a flow resistance provided by the valve chip 131*d* may increase as the piston nears full extension to provide a more controlled deceleration. In addition, a position sensor coupled to the controller 171 may be used to detect a position of the piston 167, and the controller may thus control extension of the piston so that the piston can be extended to any desired position less than full extension.

With respect to FIG. 4F, the valve chips 131*a* and 131*c* may be opened to move the piston 167 from the extended position to the retracted position. In some embodiments of the present invention, opening of one or both of the valve chips 131*a* and 131*c* may be modulated so that a first resistance to flow is provided during a first portion of the piston movement and so that a second resistance to flow is provided during a second portion of the piston movement. For example, a flow resistance provided by the valve chip 131*c* may be increased after the piston 167 begins retracting to provide that a maximum velocity is not exceeded. In addition or in an alternative, a flow resistance provided by the valve chip 131*a* may increase as the piston nears full retraction to provide a more controlled deceleration. In addition, a position sensor coupled to the controller 171 may be used to detect a position of the piston 167, and the controller may thus control retraction of the piston so that the piston can be retracted to any desired position less than full retraction.

Figure 6A:
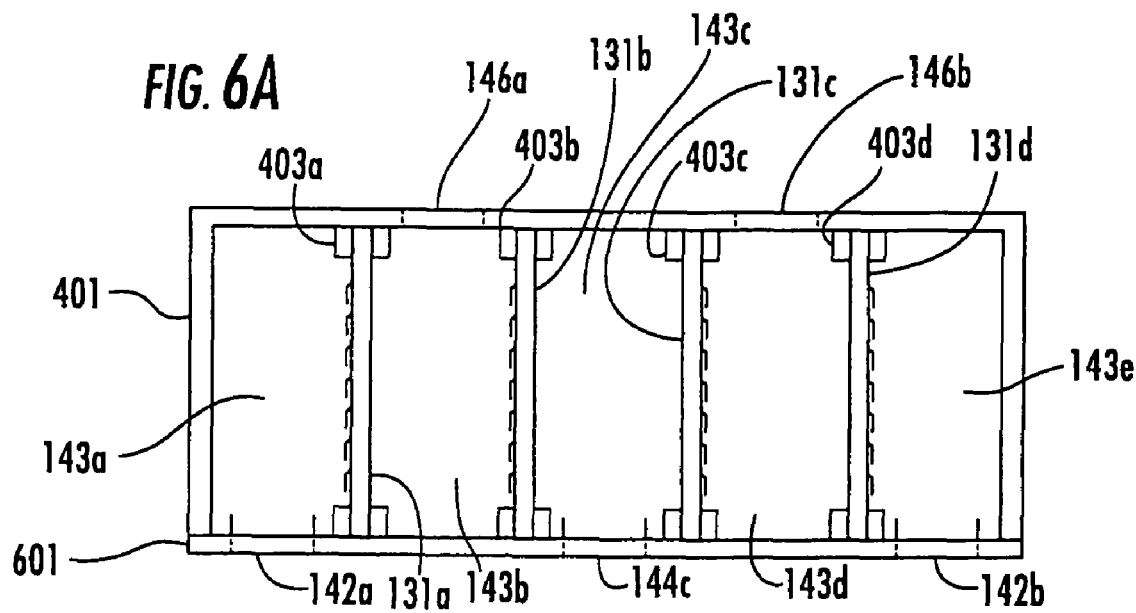
FIGS. 6A-B are schematic diagrams illustrating a valve assembly housing used to provide 5-way and 3-way valve operations according to embodiments of the present invention.

According to additional embodiments of the present invention, a valve housing 401 of the valve assembly 141 may define the chambers 143*a-e* with enclosures 403*a-d* between each of the valve chambers 143*a-e* configured to receive respective valve chips 131*a-d*. More particularly, each of the valve chips 131*a-d* may be packaged in a respective frame, and a packaged valve chip 131*a-d* may be configured to provide a fluid seal in an enclosure 403*a-d* between valve chambers 143*a-d*, as discussed, for example, in Teach et al. As shown in FIG. 6A, the housing 401 may be populated with four packaged valve chips 131*a-d* and closed with a base 601 to provide five-way valve operations as discussed above with respect to FIGS. 4A-F.

Figure 6B:
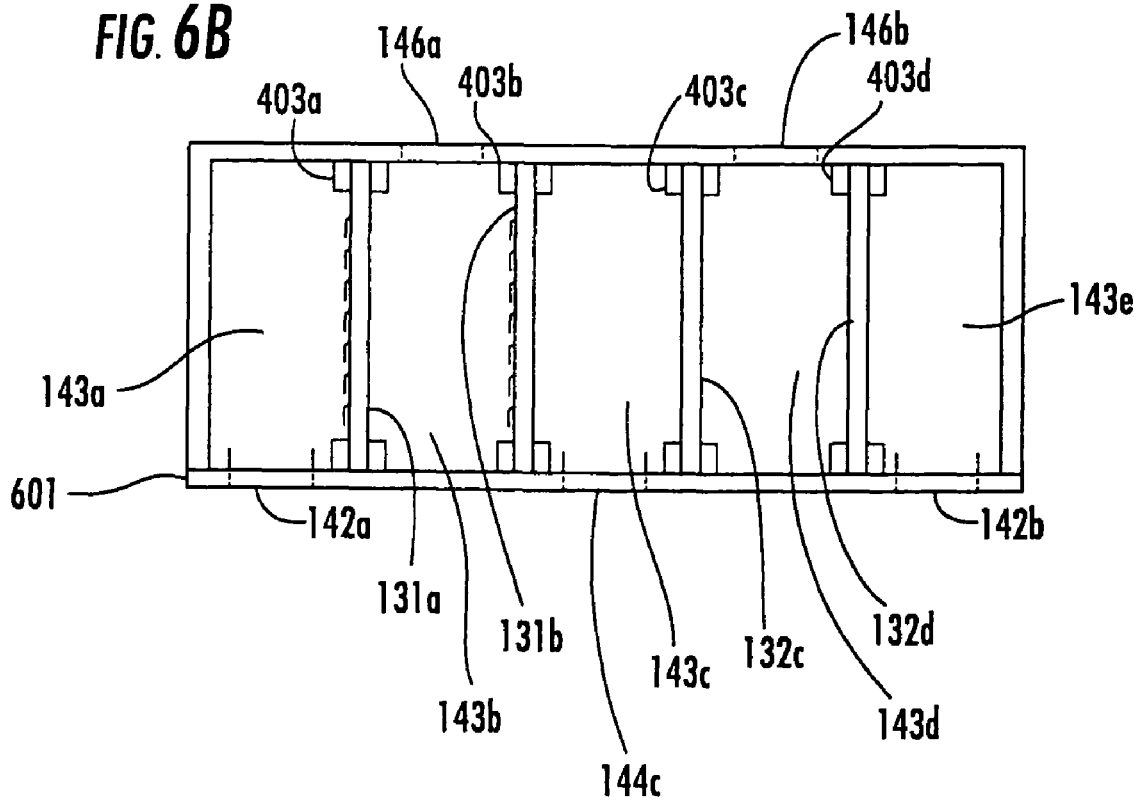

The same housing 401 and base 601 may also be used to provide three-way valve operations by substituting plugs 132*c-d* for packaged valve chips 131*c-d* to provide three-way valve operations, as shown in FIG. 6B. Accordingly, chambers 143*d-e* are sealed and non-functioning. The three-way valve configuration of FIG. 6B may be used to drive a spring loaded pneumatic actuator where pressure applied to one chamber of an actuator moves the actuator piston to a first position, and where a spring of the actuator moves the actuator piston to a second position when pressure is removed from the chamber. While a spring loaded pneumatic actuator is discussed by way of example, the three-way valve configuration of FIG. 6B may be used with other actuator types according to embodiments of the present invention. For example, an external mechanism such as a vertically actuated load may return the cylinder to its original condition.

More particularly, the valve chip 131b may be opened and the valve chip 131a may be closed to provide high pressure air from the supply port 144c to the actuator chamber. The valve chip 131a may be opened and the valve chip 131b may be closed to exhaust the actuator chamber through the exhaust port 142a. When switching between supply and exhaust, it may be desirable to provide that both valve chips 131a-b are not opened at the same time, and that sufficient delay is provided between any transition so that pressures can sufficiently equalize to allow closing of the currently opened valve chip.

In further alternatives, a housing and base can be configured for 4-way and/or 2-way valve operations. For 4-way operations, the base may be modified so that fluid coupling is provided between exhaust chambers 143a and 143e and a same exhaust port. Otherwise, 4-way operations may be provided with four valve chips as discussed above with respect to FIGS. 4A-F. In an alternative, 2-way operations may be provided using a single valve chip to provide a unidirectional on/off flow device. A 2-way device may be provided using the housing and base of FIGS. 6A-B with one valve chip and sealing plugs substituted for other valve chips. In an alternative, a 2-way device could be provided using a smaller housing with one input port, one output port, and one enclosure for a single valve chip.

Figure 7:
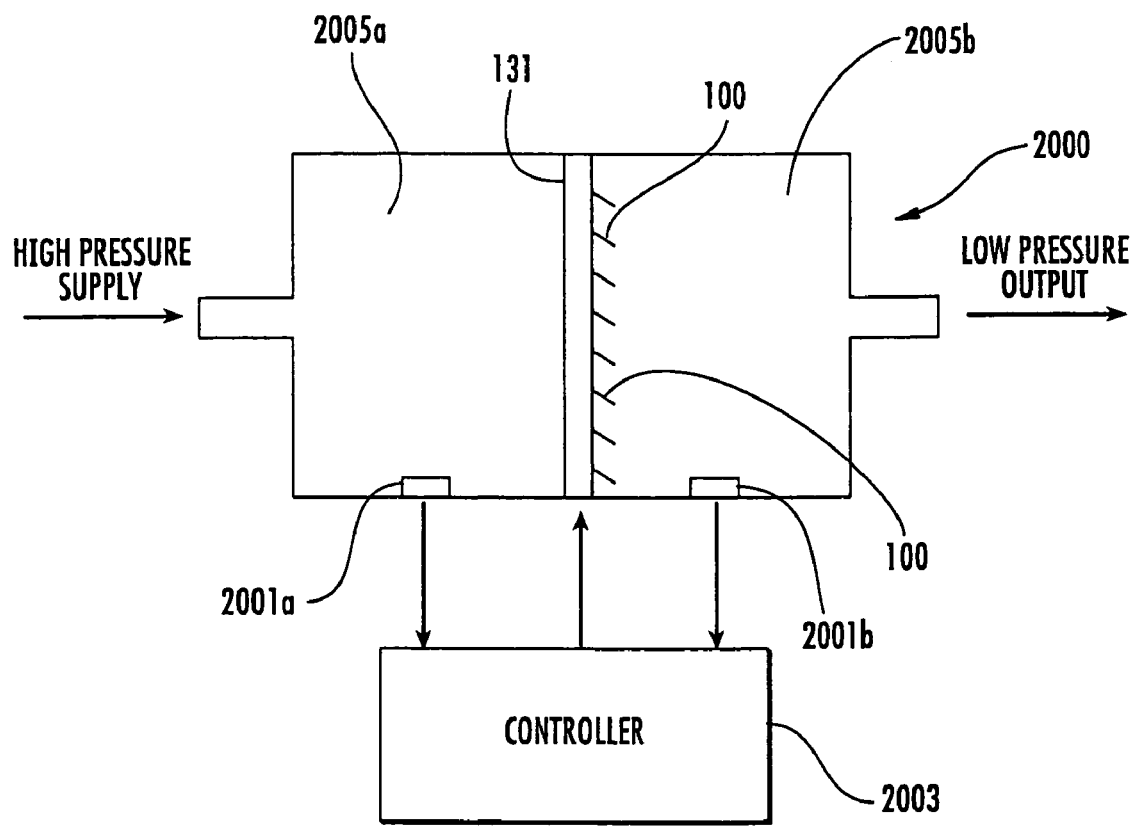
FIG. 7 is a block diagram of a mass flow controller according to embodiments of the present invention.

According to some embodiments of the present invention, a mass flow controller 2000 (MFC) may be implemented using a valve chip 131 including a plurality of valves 100 as shown in FIG. 7. More particularly, the valve chip 131 may be provided between a high pressure supply chamber 2005a and a low pressure output chamber 2005b. Moreover, flaps of the valves 100 may be provided opening toward the low pressure output chamber 2005b so that the valve chip 131 can regulate a gas flow from the high pressure supply chamber 2005a to the low pressure output chamber 2005b. The controller 2003 may control operations of the valves 100 responsive to a desired flow and signals from the high pressure chamber sensor 2001a and the low pressure chamber sensor 2001b.

Each of the chamber sensors 2001a and 2001b may provide measurements of conditions (such as pressure and/or temperature) in the respective chambers 2005a and 2005b, and the controller 2003 can use these measurements to determine a mass flow through the mass flow controller 2000. Based on the measurements from the sensors 2001a and 2001b, the controller 2003 can determine the current mass flow through MFC 2000, and then either increase or decrease the mass flow by modulating the valves 100 of the valve chip 131. Accordingly, the sensors 2001a and 2001b may provide a real time feedback loop.

The controller 2003 can modulate the valves 100 by changing a duty cycle at which the valves 100 open and close at a modulation frequency. A maximum mass flow may be provided with a 100% open duty cycle so that the valves 100 are left open, and substantially no mass flow may be provided with a 0% open duty cycle so that the valves 100 are left closed. Accordingly, the controller 2003 can monitor the mass flow through the MFC 2000 using measurements from the sensors 2001a and 2001b, and determine whether the current mass flow is greater than or less than a desired mass flow. If the current mass flow is less than a desired mass flow, the controller 2003 may increase a duty cycle at which the valves 100 are opened and closed at the modulation frequency. If the current mass flow is greater than a desired mass flow, the controller may reduce a duty cycle at which the valves 100 are opened and closed at the modulation frequency. Accordingly, the stationary electrodes of all of the valves 100 may be electrically connected to a first electrode, the flap electrodes of all of the valves 100 may be electrically connected to a second electrode, and the controller may apply opening and closing electrical potentials across the first and second electrodes at the duty cycle determined by the controller to control the mass flow.

In an alternative, the controller 2003 can modulate the valves 100 by changing numbers of valves 100 that are opened and closed. A maximum mass flow may be provided by opening all of the valves 100, and substantially no mass flow may be provided by closing all of the valves 100. Accordingly, the controller 2003 can monitor the mass flow through the MFC 2000 using measurements from the sensors 2001a and 2001b, and determine whether the current mass flow is greater than or less than a desired mass flow. If the current mass flow is less than a desired mass flow, the controller 2003 may increase a number of the valves 100 that are opened. If the current mass flow is greater than a desired mass flow, the controller may reduce a number of the valves 100 that are opened. Accordingly, stationary electrodes and/or flapper electrodes of individual valves 100 and/or groups of valves 100 may be connected to separate electrodes, so that the controller 2003 may separately address individual valves 100 and/or groups of valves 100. By way of example, the valve chip 131 may include 63 valves 100 with a first group of one valve, a second group of two valves, a third group of four valves, a fourth group of eight valves, a fifth group of sixteen valves, and a sixth group of 32 valves. By separately controlling each group of valves, the controller can provide 64 levels of flow control from substantially no flow with all groups of valves closed to a maximum flow with all groups of valves open.

Figure 8:
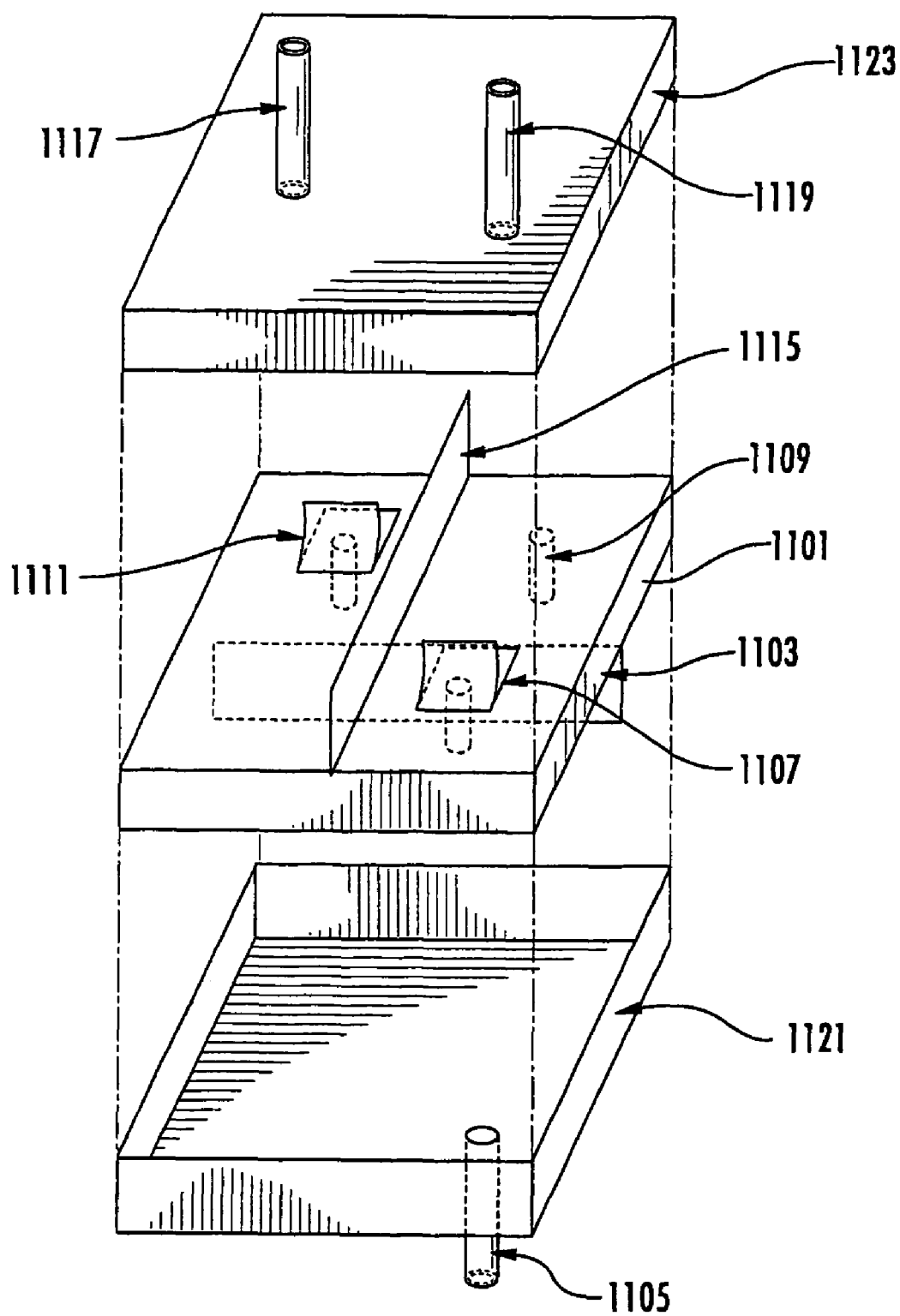
FIG. 8 is an isometric view of a three way valve assembly implemented with a single valve chip according to embodiments of the present invention.

According to additional embodiments of the present invention, a three-way valve assembly may include two electrostatically actuated valves and one feed through hole on a single substrate as illustrated in the exploded view of FIG. 8. The substrate 1101 may be sealed within a package including a lower divider 1103, an upper divider 1115, a lower capping structure 1121 and an upper capping structure 1123. The lower divider 1103 defines a first lower cavity in communication with an inlet port 1105 from a high pressure source and an inlet valve 1107, and defines a second lower cavity in communication with a feed through hole 1109 and an outlet valve 1111.

The upper divider 1115 defines a first upper cavity in communication with the outlet valve 1111 and an exhaust port 1117, and defines a second upper cavity in communication with the inlet valve 1107, the feed through hole 1109, and the cylinder port 1119 to a chamber of the pneumatic cylinder. When both valves are closed, the cylinder port 1119 is isolated from both the inlet port 1105 and the exhaust port 1117. When the inlet valve 1107 is opened, air from the high pressure source can flow from the inlet port 1105 through the inlet valve 1107 to the cylinder port 1119. When the outlet valve 1111 is opened and the inlet valve 1107 is closed, air from the chamber of the pneumatic cylinder can flow from the cylinder port 1119 through the feed through hole 1109, the outlet valve 1111, and the exhaust port 1117.

Figure 9:
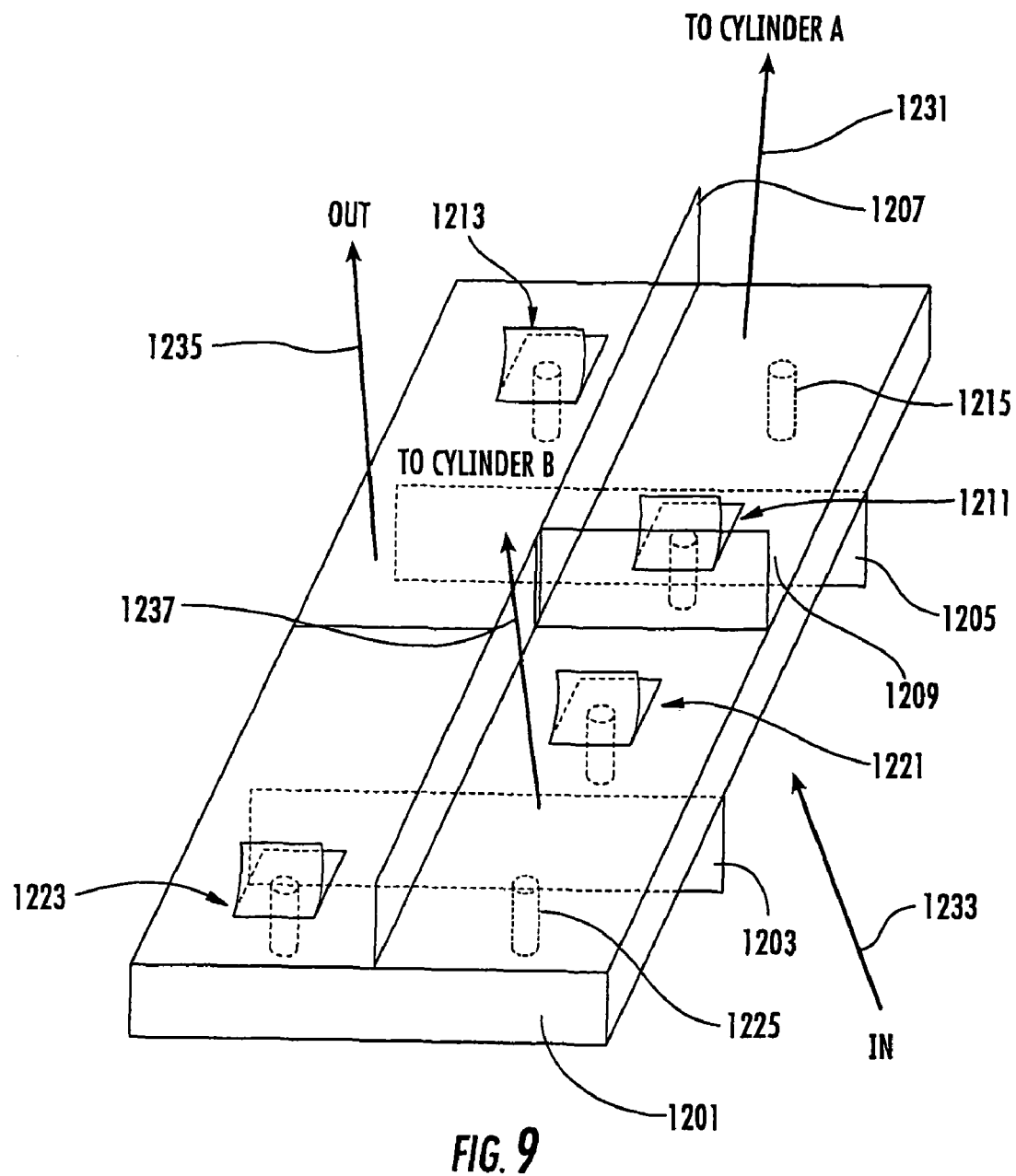
FIG. 9 is an isometric view of a four way valve assembly with top and bottom covers removed implemented with a single valve chip according to embodiments of the present invention.

According to yet additional embodiments of the present invention, a four-way valve assembly may include 4 electrostatically actuated valves and two feed through holes on a single substrate as illustrated in FIG. 9. The substrate 1201 may be sealed within a package including a first lower divider 1203, a second lower divider 1205, a first upper divider 1207, and a second upper divider 1209. (Upper and lower capping structures are omitted from the illustration for the sake of clarify.) The four-way valve of FIG. 9 may provide the functionality of two three-way valves so that, for example, control of a double acting pneumatic cylinder can be provided on a single substrate.

When both A inlet valve 1211 and A outlet valve 1213 are closed, the A cylinder port 1231 may be isolated from both the high pressure inlet port 1233 and the exhaust port 1235. When the A inlet valve 1211 is opened, air may flow from the high pressure inlet port 1233 through the A inlet valve 1211 to the A cylinder port 1231. When the A outlet valve 1213 is opened, air from the A chamber of the pneumatic cylinder may flow from the A cylinder port 1231 through the A feed through hole 1215, and the A outlet valve 1213 to the exhaust port 1235.

When both the B inlet valve 1221 and the B outlet valve 1223 are closed, the B cylinder port 1237 may be isolated from both the high pressure inlet port 1233 and the exhaust port 1235. When the B inlet valve 1221 is opened, air from the high pressure inlet port 1233 may flow through the B inlet valve 1221 to the B cylinder port 1237. When the B outlet valve 1223 is opened, air from the B chamber of the pneumatic cylinder may flow from the B cylinder port 1237 through the B feed through hole 1225, and the B outlet valve 1223 to the exhaust port 1235.

Figure 10:
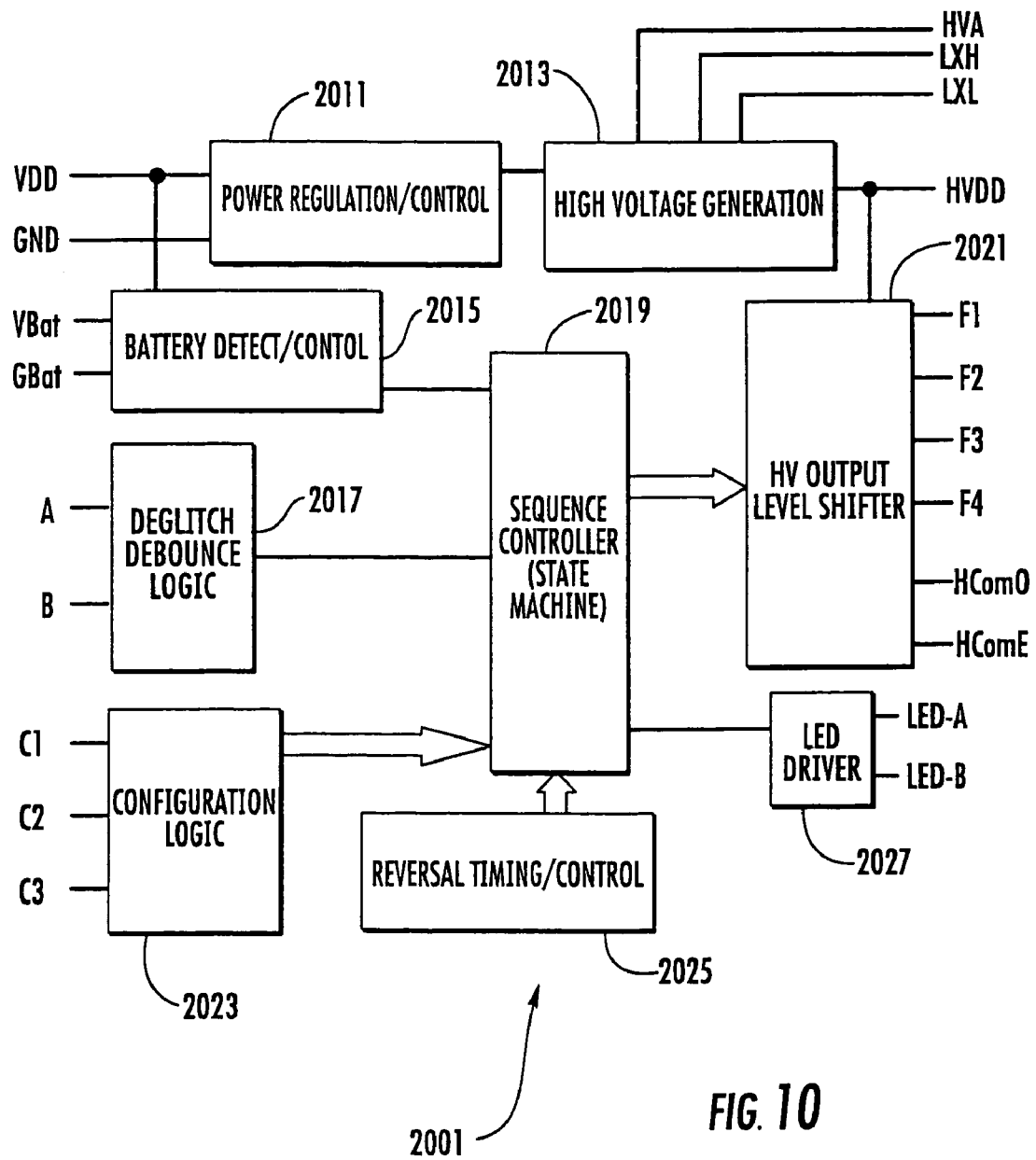
FIG. 10 is a block diagram illustrating functionalities of a custom circuit (for example, including an Application Specific Integrated Circuit (ASIC)) for controllers according to some embodiments of the present invention.
Figure 11:
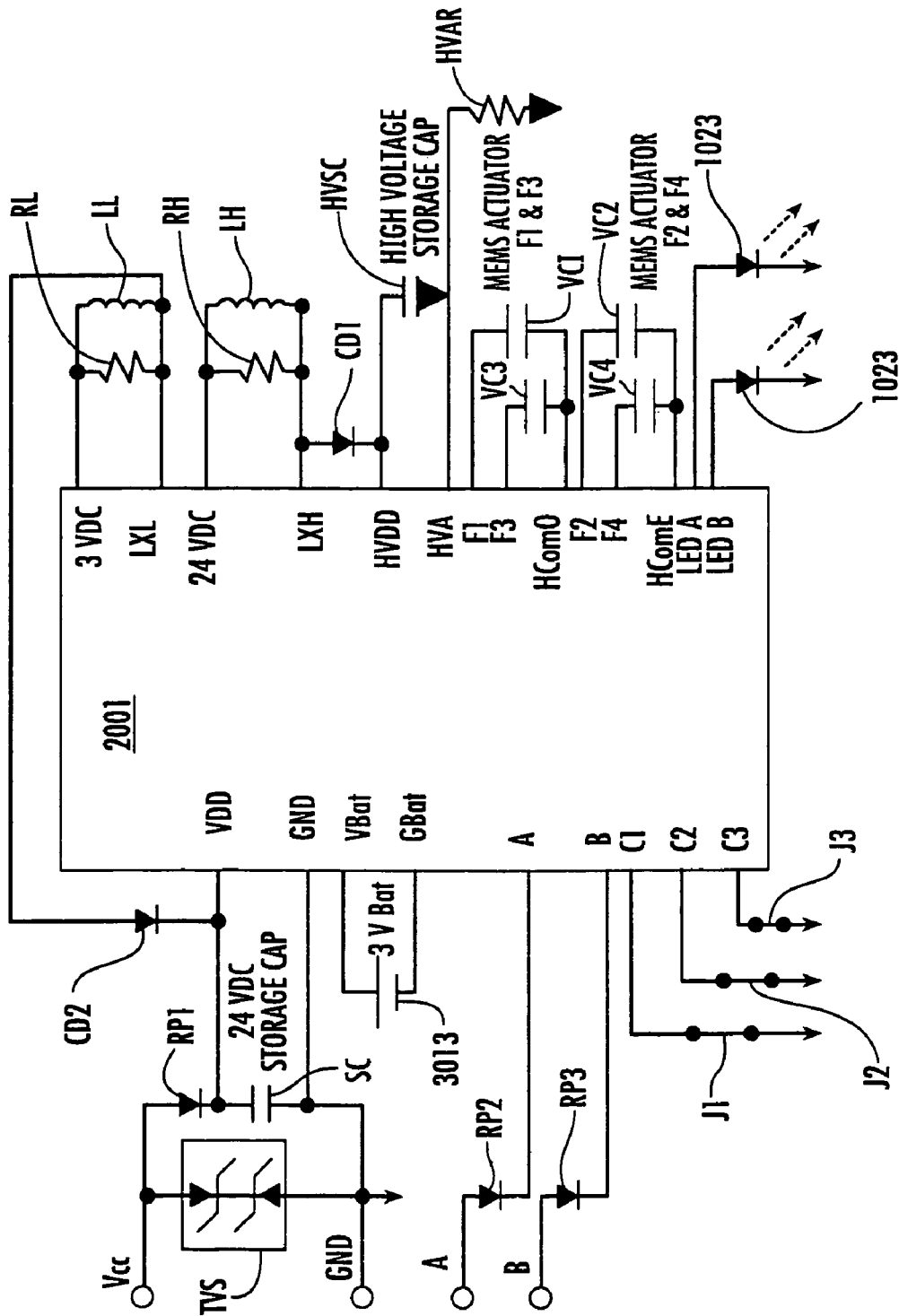
FIG. 11 is a schematic diagram of electronic sub-assemblies including a custom circuit according to some embodiments of the present invention.

According to some embodiments of the present invention, electrical functionalities of the controller 171 discussed above with regard to FIG. 5 may be provided using a custom circuit (for example, including one or more Application Specific Integrated Circuits also referred to as ASICs). FIG. 10 is a block diagram illustrating functional blocks of a circuit 2001 according to some embodiments of the present invention, and FIG. 11 is a schematic diagram illustrating elements of a printed circuit board including the circuit 2001 of FIG. 10.

As shown in FIG. 10, the circuit 2001 may include a power regulation/control circuit 2011, a high voltage generation circuit 2013, a battery detect/control circuit 2015, a deglitch/debounce logic circuit 2017, a sequence controller (state machine) circuit 2019, a high voltage (HV) output level shifter circuit 2021, a configuration circuit 2023, a reversal timing/control circuit 2025, and a light emitting diode (LED) driver circuit 2027. As shown, the power regulation/control circuit 2011 may receive external power supply VDD and ground GND signals through respective connectors providing electrical coupling to an external control device such as a programmable controller. Similarly, the deglitch/debounce logic circuit 2017 may receive input control signals A and B through connectors providing electrical coupling to an external control device such as a programmable controller. The battery detect/control circuit 2015 may receive the battery power supply VBat and ground GBat signals from a battery provided at/in the controller 171.

The outputs F1-F4 and HComO and HComE of the HV output level shifter circuit 2021 are used to drive the valve chips of the valve assembly with the outputs F1-F4 and HComO and HComE being coupled to respective valve chips through leads of the main housing (such as through leads 175*a-d* and 173*a-b* of FIG. 5). More particularly, the valve chips of the valve assemblies may be identified as first (most distant from the controller) through fourth (closest to the controller) with the high voltage outputs F1 to F4 being respectively applied to the first through fourth valve chips 131*a-d*, with the High Voltage Common Odd HComO signal being applied to the first and third valve chips 131*a* and 131*c*, and with the High Voltage Common Even HComE signal being applied to the second and fourth valve chips 131*b* and 131*d*.

The configuration logic circuit 2023 may receive configuration select signals C1-C3 which may be either grounded or floating. As shown in FIG. 11, the circuit 2001 may be provided on a printed circuit board with each of the configuration select signals/pins C1-C3 either coupled to ground through a respective jumper J1-J3 or floating (by removing the respective jumper). In an alternative, traces to ground for respective configuration select signals/pins C1-C3 may be either maintained or cut before packaging to provide that respective configuration select signals/pins are either grounded or floating. Moreover, the LED driver circuit 2027 outputs LED-A and LED-B may drive respective LEDs 1023.

The custom circuit of FIGS. 10 and 11 may be configured so that the resulting valve assembly can be used as a drop-in replacement for a conventional solenoid driven valve. Accordingly, the physical and electrical interfaces for the electronics sub-assembly may conform to physical and electrical interfaces used for conventional solenoid driven valves. For example, the deglitch/debounce logic circuit 2017 may be configured to receive input controls signals A and B used for solenoid driven valves. As shown in FIGS. 10 and 11, four separate high voltage output signals F1-F4 may be provided, and each valve chip load can effectively be modeled as a capacitor VC1-VC4 with hysteresis. The capacitors VC1-VC4 thus represent valve chips provided in a main valve housing as opposed to elements provided on a printed circuit board in a controller. Moreover, the high actuation voltages may be generated using charge pumps, inductor circuits, and/or combinations thereof, and/or other circuits known to those having skill in the art.

The high voltage generation circuit 2013 may be configured to convert a low voltage source (such as a 24 Volt external power supply signal VDD and/or a 3 Volt battery power supply signal VBat) to a high voltage signal, such as a 200 Volt DC signal. The HV generation circuit 2013, for example, may include a series of charge pumps provided on the circuit 2001. In addition or in an alternative as illustrated in FIGS. 10 and 11, external inductor coils LL and LH may be provided in parallel with external resistors RL and RH to provide one or more boost converters used to generate high voltage signals while reducing a size and/or cost of the circuit 2001. Moreover, an absolute value of the high voltage(s) thus generated may be adjusted to accommodate different actuation voltages used for different applications and/or to accommodate variations in characteristics of different circuits (such as different ASICs) resulting from manufacturing variations. The resulting high voltages may be adjusted using a resistor HVAR as part of a divider used with a comparator of the HV generation circuit 2013 to control when the high voltage generation circuit 2013 is active.

Upon loss of the primary power source (e.g., upon loss of the external power supply signal VDD), a controller including the circuit 2001 may be configured to provide that the valve assembly can maintain a state or transition to a desired state. Accordingly, the controller including the circuit may be configured to provide sufficient energy from a battery (such as battery 3013 of FIG. 11) to overcome leakage through the electrostatically actuated valve chips while maintaining the valve chips in a desired state for an indefinite period during loss of the external power supply signal VDD (which may be a 24 Volt supply).

Upon detection of a power loss, energy may also be needed to switch the high voltage output signals F1-F4 to a predefined condition, depending upon a particular application and state of the inputs at the time of the power loss. A relatively low-cost 3 Volt lithium primary battery may be used to provide energy to maintain high voltage output signals F1, F2, F3, and/or F4 when the DC external power supply signal VDD is lost and/or interrupted. In an alternative, a rechargeable lithium ion battery having a voltage output in the range of 3.0 to 4.2 Volts may be used, with the circuit 2001 being configured to recharge the battery when the external power supply signal VDD is present.

During normal operation with the external power supply signal VDD available, the deglitch/debounce logic circuit 2017 may receive and/or filter the input control signals A and B, and the deglitch/debounce circuit 2017 may provide the input control signals A and B to the sequence controller 2019. With the external power supply signal VDD available, the sequence controller circuit 2019 directs operation of the HV output level shifter circuit 2021 in accordance with the input control signals A and B and in accordance with a circuit configuration defined by the configuration signals C1-C3. During loss of the external power supply signal VDD, the battery detect/control circuit 2015 may detect the power loss, and a power loss signal may be generated by the detect/control circuit 2015 and provided to the sequence controller circuit 2019. During loss of the external power supply signal VDD, the sequence controller circuit 2019 directs operation of the HV output level shifter circuit 2021 in accordance with a power loss mode defined by the configuration signals C1-C3 (without regard to the input control signals A and B).

Operation during loss of the external power supply signal VDD may impact operations of the various components of the circuit 2001 because of the limited energy available from the battery. Stated in other words, one or more of the components of the circuit 2001 may be configured to operate in a low power mode during loss of the signal VDD to extend life of the battery. For example, the HV output level shifter circuit 2021 may be configured to provide low leakage operation, high voltage generation oscillators of the HV generation circuit 2013 may be operated on an "as-needed" basis during loss of the signal VDD, and/or the LED driver circuit 2027 may be configured to provide a leakage-only mode during loss of the signal VDD. By reducing current drawn from the battery, operation using the battery can be extended for a longer period of time during loss of the signal VDD.

In addition, the battery detect/control circuit 2015 may be configured to detect a low battery voltage and to indicate the need for a replacement battery, for example, by flashing one or both of the LEDs 1023. More particularly, the battery detect/control circuit 2015 may periodically sample the battery voltage under a nominal load, and the battery detect/control circuit 2015 may indicate that a replacement battery is needed when the battery voltage signal VBat falls to approximately 2 Volts (to accommodate different battery types). For example, the battery detect/control circuit 2015 may sample the battery voltage using a nominal load providing an input resistance of at least approximately 10 M-ohms.

Logical relationships between inputs and outputs (of controllers including the circuit 2001 illustrated in FIGS. 10 and 11) are provided in the table of FIG. 12. An exponential rise and fall (a capacitor charged and discharged through a transistor) may be sufficient to drive the electrostatically actuated valve chips. Wave shaping (such as an intentional overshoot and settling voltage), however, may be provided according to some embodiments of the present invention. In the table of FIG. 12, X denotes a "don't care" condition for the respective signal. Where a "don't care" condition is indicated for one or both of the input control signals A and/or B, however, the input control signal may be driven to a high or low voltage at all times.

As shown in the table of FIG. 12, a 5-way, 3-position, cylinder ports exhausted configuration may be achieved by providing that the configuration signals C1 and C2 are grounded (indicated as 0). During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signals A and B as indicated. When the configuration signal C3 is grounded and the signal VDD is interrupted, the HV output signals F1-F4 may be driven to the "00" state such that the first and fourth valve chips are opened and the second and third valve chips are closed (i.e., both cylinder ports are exhausted) without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

A 5-way, 3-position, all ports blocked configuration may be achieved by providing that the configuration signal C1 is grounded (indicated as 0) and that the configuration signal C2 is floating (indicated as 1). During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signals A and B as indicated. When the configuration signal C3 is grounded and the signal VDD is interrupted, the HV output signals F1-F4 may be driven to the "00" state such that all of the valve chips are closed (i.e. both cylinder ports are isolated from high pressure and exhaust ports) without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

A 5-way, 3-position, cylinder ports energized configuration may be achieved by providing that the configuration signal C1 is floating (indicated as 1) and that the configuration signal C2 is grounded (indicated as 0). During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signals A and B as indicated. When the configuration signal C3 is grounded and the signal VDD is interrupted, the HV output signals F1-F4 may be driven to the "00" state such that the first and fourth valve chips are closed and the second and third valve chips are opened (i.e., both actuator ports are energized) without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

A 5-way, 2-position configuration may be achieved by providing that the configuration signals C1 and C2 are floating (indicated as 1). Here, only one input control signal B is used, and the input control signal A is thus in a "don't care" condition. During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signal B as indicated. When the configuration signal C3 is grounded and the signal VDD is interrupted, the HV output signals F1-F4 may be driven to the "0" state such that the first and third valve chips are opened and the second and fourth valve chips are closed without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

When a voltage is applied to an electrostatically actuated valve chip continuously for a sufficient period of time, charge build-up may cause deactivation delays. As applications according to some embodiments of the present invention may require that a given state be maintained for days or even weeks, charge build-up may need to be reduced. By periodically reversing the polarity of the applied voltage in this situation, residual charges can be reduced thereby reducing charge build-up and associated actuation delays. Because the valve chip is electrostatic, the polarity of the applied voltage does not matter. Moreover, if the polarity can be reversed before the valve chip can fully open, physical operation of the device may not be significantly affected.

Accordingly, the circuit may be configured to periodically reverse the polarity of a HV output signal (e.g., F1, F2, F3, and/or F4) applied to a valve chip being held closed for a significant period of time to thereby reduce charge build-up. With an on-chip oscillator used in the high voltage generation circuit 2013, a signal can be derived for timing of the polarity switching. An absolute period of the oscillation may not be critical for any of the functions of the high voltage generation circuit.

A minimum length of time ($t_{rev}$) to wait between polarity reversals may be determined based on characteristics of the valve chips being used. Since charge build-up may also occur when the battery is being used to hold the valve chip states during loss of the external power supply signal VDD, polarity reversals may also be provided throughout power interruptions. Accordingly, polarity reversals may be triggered when the HV generation circuit 2013 is periodically activated during power outages so that continuous operation of oscillators of the HV generation circuit is not required during power outages. Moreover, if the input control signals A and B change state during a polarity reversal operation, the polarity reversal may be completed before responding to the new input control signal command.

When switching from one state to another, product functionality may require that the sequence controller circuit 2019 provide a controlled sequence of deactivations and/or activations during a transition from one operational state to the next as discussed above, for example, with respect to FIGS. 4A-F. In other words, a timed sequence of output states may be desired after a control input signal changes and/or after a power status changes. Moreover, polarity reversals may include sequencing through a series of intermediate states during execution thereof. More particularly, sequencing through intermediate states may provide that specific output combinations do not occur for even an instant, and that certain intermediate conditions are given sufficient time to settle.

As shown in the table of FIG. 12, there may be 5 unique operational states of the HV output signals F1-F4 (0101, 1010, 1111, 0010 and 1001) and 14 different transition from one operational state to another. Examples of sequences for all 14 state changes are shown in FIG. 13 according to some embodiments of the present invention. FIG. 13 also illustrates sequences that may be used to execute the 5 polarity reversal transitions (for each of the five operational states). In addition, a minimum time delay ($t_{del}$) may be provided before switching to the states indicated in bold. In addition, the polarity reversal sequences of FIG. 13 may occur during power loss modes. Accordingly, high voltage signal transitions may be required using battery power during power outages.

A valve chip having its polarity reversed first goes through a state where zero volts is applied across it. These points of zero crossings are indicated with over-line (i.e., "$\overline{0}$") in FIG. 13. After the circuit 2001 achieves an over-lined state where both HV output signals of a pair (e.g., F1 and F3, or F2 and F4) are driven with zero potential difference relative to the respective shared common signal (e.g., HComO or HComE), the polarity of the shared common signal relative to the respective HV output signal pair can be reversed. If the HV output signals were initially at a high voltage potential relative to the respective shared common signal at the beginning of the polarity reversal operation, the pair of high voltage output signals and the respective shared common signal may all be pulled to the high voltage potential during the transition, and then the pair of high voltage output signals may be pulled to a low voltage potential relative to the respective shared common signal. If the HV output signals were initially at a low voltage potential relative to the respective shared common signal at the beginning of the polarity reversal operation, the pair of high voltage output signals and the respective shared common signal may all be pulled to the low voltage potential during the transition, and then the pair of high voltage output signals may be pulled to a high voltage potential relative to the respective shared common signal.

FIGS. 14A-B provide a summary of input/output signals and/or pins of the circuit 2001. Multiple bond pads may be provided for some of these pins to accommodate potential current surges.

Electrostatic Discharge (ESD) circuit protection may be provided within the circuit 2001 on all input/output pins of the circuit 2001 in compliance with IEC 61000-4-2, Compliance Level 2 (4 kV for contact). In addition, the input control signal pins (A and B) and the power supply pins (VDD and GND) may be provided with external Electrical Fast Transients (EFT) circuits per IEC 61000-4-4, to Compliance Level 4. In particular, a transient voltage suppressor TVS (for example, including two zener diodes) and/or a storage capacitor SC may be provided between the main power supply signal/pin VDD and the ground signal/pin GND. In addition, a diode RP1 may be provided between the external power supply Vcc and the main power supply signal/pin VDD. In addition, diodes RP2 and RP3 may be provided for the input control signals/pins A and B. FIGS. 15A-B provide design parameters for the circuit 2001 according to some embodiments of the present invention.

A Transient Voltage Suppressor TVS may include a pair of zener diodes connected between the input power supply signal Vcc/VDD and ground GND. The zener diodes may be placed in series with their cathodes connected as shown in FIG. 11. The transient voltage suppressor TVS may provide over-voltage protection and may provide protection from relatively large, fast transients. The transient voltage suppressor TVS may be located relatively distant from the circuit 2001 on the printed circuit board for the electronics sub-assembly to facilitate reliable transient protection. Volumes, thicknesses, widths, lengths, and materials for traces of the printed circuit board from the electronics sub-assembly may be selected to provide effective signal paths for normal operations and also to provide transient protection at elevated temperatures.

A reverse polarity diode RP1 may also be provided in series with the circuit 2001 between the power supply pin VDD and the external power supply Vcc (such as a 24 Volt DC external power supply), and the reverse polarity diode RP1 may provide reverse polarity protection for the circuit 2001. Additional diodes RP2 and RP3 may provide reverse polarity protection for input control signals/pins A and B. A storage capacitor SC may be provided in parallel with the transient voltage suppressor TVS, and the storage capacitor SC may provide low pass filtering. The storage capacitor SC may also act as a storage device to provide power to the circuit 2001 during loss of external power. After external power (i.e., Vcc) is lost, the storage capacitor SC may source sufficient electrical current so that the circuit 2001 may detect the power loss and/or begin transition to a power loss operational mode until the circuit can switch to the battery 3013.

The high voltage generation circuit 2013 may generate the high voltage HVDD using resistors RL and/or RH and inductors LL and/or LH to create inductive kickback used to charge the storage capacitor HVSC. The resistors RL and/or RH may be used to limit a maximum kickback voltage, to thereby generate a sufficiently high voltage without damaging switching circuits of the high voltage generation circuit 2013.

A rate of current change in an inductor is dependent on a voltage applied across it. A voltage across an inductor can be calculated using the equation: $V=L\,(di/dt)$, and providing a voltage across an inductor may cause the current through the inductor to rise as a ramp. If a switch sourcing/sinking current to/from the inductor is opened, a voltage across the inductor will rise because the current through the inductor cannot change suddenly due to the inductor property that $V=L\,di/dt$. When the switch is opened, the voltage across the inductor will suddenly rise to a level sufficient to force current to flow. By providing the resistors RL and RH in parallel with the inductors LL and LH, a maximum current generated by the inductors can be limited and the possibility of damaging the circuit 2001 can be reduced. As shown in FIG. 10, the inductive kickback circuit including inductor LH and resistor RH may be used to charge the high voltage storage capacitor HVSC through the charging diode CD1. During power outages, the inductive kickback circuit including inductor LL and resistor RL may be used to charge the storage capacitor SC through the charging diode CD2.

Controllers and/or control circuits as discussed above, for example, with respect to FIGS. 5, and 10-13, 14A-B, and 15A-B may be configured to provide different modes of operation. As discussed above with respect to FIG. 12, different modes (eg., 5-way 3-position cylinder ports exhausted, 5-way 3-position all ports blocked, 5-way 3 position cylinder ports energized, 5-way 2-position, etc.) may be selected using configuration selection pins (e.g., C1, C2, C3, etc.). More particularly, a particular mode of operation for the controller may be selected during and/or after assembly by selectively grounding and/or floating the configuration selection pins. For example the selection may be made during manufacture before the controller is sealed so that the configuration thereof does not change after manufacture. In an alternative, access to configuration selection pins may be provided so that an end user can change a configuration thereof at any time.

In an alternative, the controller may include non-volatile programmable memory used to store configuration selection values used to select a particular mode of operation. Three bits of programmable memory, for example, could be used to provide the configuration selections of FIG. 12. Moreover, the programmable memory could be reprogrammed to store different configuration selection values. By way of example, different configuration selection values may be provided from outside the controller using a serial bus.

In addition or in an alternative, the controller may include non-volatile programmable memory used to store computer readable program code defining operation of the controller, and the non-volatile programmable memory may be reprogrammed during and/or after manufacture. A serial bus connection, for example, may be provided on the controller so that the memory can be reprogrammed using the serial bus connection after manufacture.

The controller can be configured, for example, to provide the different modes discussed above with respect to FIG. 12. In addition or in alternatives, other aspects of valve operations may be configured and/or reconfigured. For example, the controller may be configured to provide different timings and/or delays for valve sequences; to provide different valve sequences; to provide different actuator acceleration/deceleration profiles; to provide different actuator velocity profiles. etc. Controller configurations may also be changed "on the fly", for example, so that a machine including the controller and the controlled valve can change its operation by reprogramming the controller over a serial bus connection.

Figure 16:
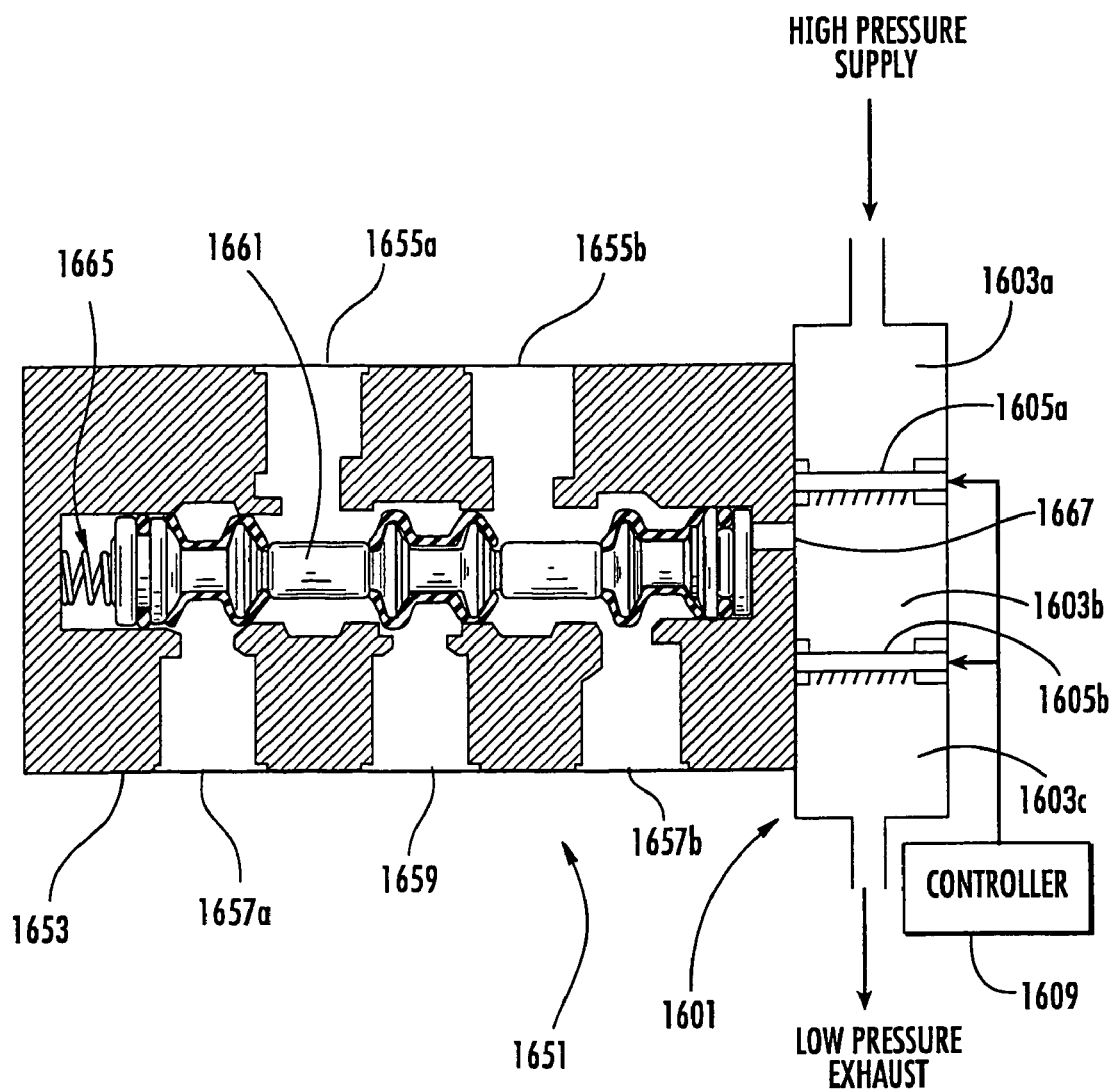
FIG. 16 is a block diagram of a pilot valve coupled to a spool-type valve according to embodiments of the present invention.

As shown in FIG. 16, a pilot valve 1601 for a mechanical 5-way spool type valve 1651 may be provided using electrostatically actuated valves according to embodiments of the present invention. More particularly, a body 1653 of the spool type valve 1651 may include first and second actuator ports 1655a-b, first and second exhaust ports 1657a-b, and high pressure supply port 1659. In addition, a spool 1661 may be provided in an interior cavity of the body 1653, and a spring 1665 may bias the spool to a default condition so that the exhaust port 1657b is in fluid communication with the actuator port 1655b, and so that the high pressure supply port 1659 is in fluid communication with the actuator port 1655a. Moreover, the spring 1665 is provided at one end of the spool 1665, and a control port 1667 is provided in the body 1653 at a second end of the spool 1661.

As further shown in FIG. 16, the pilot valve may include three chambers 1603a-c separated by the electro-statically actuated valve chips 1605a-b. More particularly, the valve chip 1605a is configured to block or allow fluid flow from the high pressure supply chamber 1603a to the control chamber 1603b, and the valve chip 1605b is configured to block or allow fluid flow from the control chamber 1603b to the low pressure exhaust chamber 1603c. The controller 1609 is configured to control the valve chips 1605a-b to in turn control positioning of the spool 1661 of the spool type valve 1651.

In a first condition, the controller 1609 may apply a sufficient high voltage difference to the valve chip 1605a so that the valve flaps thereof close thereby blocking fluid flow from the high pressure supply chamber 1603a to the control chamber 1603b, and the controller 1609 may apply a sufficiently low voltage difference to the valve chip 1605b so that the valve flaps thereof open thereby allowing fluid flow from the control chamber 1603b to the low pressure exhaust chamber 1603c. In the first condition, fluid communication is thus provided from the control port 1667 through the control chamber 1603b, through the valve chip 1605b, and through the low pressure exhaust chamber 1603c to the low pressure exhaust. A low pressure is thus applied to the control end of the spool 1661 so that the spring 1665 pushes the spool 1661 to the default condition illustrated in FIG. 16. In the default condition, fluid communication is provided between the exhaust port 1657b and the actuator port 1655b, and between the high pressure supply port 1659 and the actuator port 1655a.

In a second condition, the controller 1609 may apply a sufficient low voltage difference to the valve chip 1605a so that the valve flaps thereof open thereby allowing fluid flow from the high pressure supply chamber 1603a to the control chamber 1603b, and the controller 1609 may apply a sufficiently high voltage difference to the valve chip 1605b so that the valve flaps thereof close thereby blocking fluid flow from the control chamber 1603b to the low pressure exhaust chamber 1603c. In the second condition, fluid communication is thus provided from the high pressure supply through the high pressure supply chamber 1603a, through the valve chip 1605a, and through the control chamber 1603b to the control port 1667. A high pressure is thus applied to the control end of the spool 1661 so that the spool is pushed against the spring 1667 to an energized condition. In the energized condition, fluid communication is provided between the exhaust port 1657a and the actuator port 1655a, and between the high pressure supply port 1659 and the actuator port 1655b.

Moreover, opening and closing of valve flaps of the valve chips 1605a-b may be timed so that both valve chips are not open at the same time. Time delays may also be provided between closing one valve and opening the other valve to improve fluid flows, reduce pressure spikes, etc. The valve chips 1605a-b, the controller 1609, and/or a housing of the pilot valve 1601 may be provide as discussed above, for example, with respect to FIGS. 1-3, 5, 6B, and 10-15. While the high pressure supply and low pressure exhaust ports are shown at ends of the pilot valve 1601 of FIG. 16, other placements (such as on a side of the pilot valve) may be provided.

Figure 17:
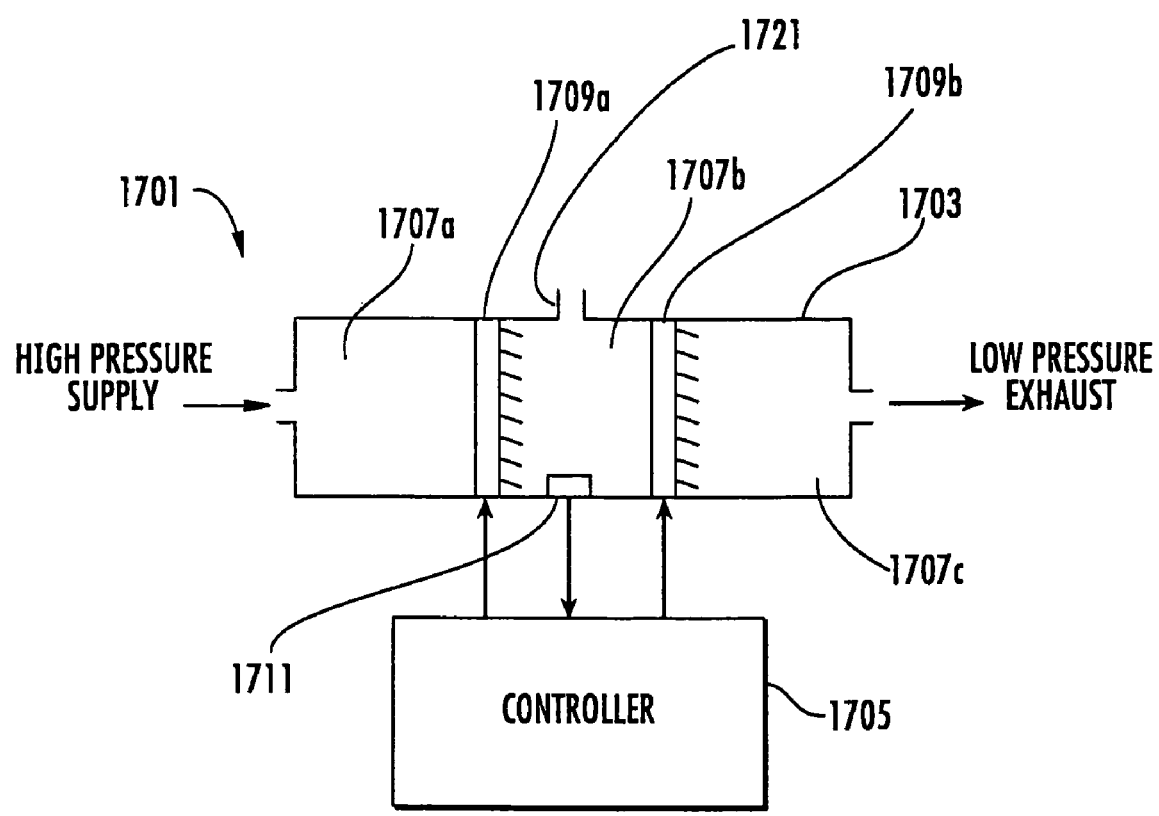
FIG. 17 is a block diagram of a pressure regulator according to embodiments of the present invention.

As shown in FIG. 17, a pressure regulator 1701 may be provided using electrostatically actuated valves according to embodiments of the present invention. More particularly, a body 1703 of the pressure regulator 1701 may include three chambers 1707a-c separated by the electrostatically actuated valve chips 1709a-b. More particularly, the valve chip 1709a is configured to block or allow fluid flow from the high pressure supply chamber 1707a to the regulated chamber 1707b, and the valve chip 1709b is configured to block or allow fluid flow from the regulated chamber 1707b to the low pressure exhaust chamber 1707c. In addition, a pressure sensor 1711 may be provided in the regulated chamber 1707b. The controller 1705 is configured to control the valve chips 1709a-b responsive to a pressure signal generated by the pressure sensor 1711 to thereby maintain a desired pressure in the regulated chamber.

If a pressure in the regulated chamber 1707b drops below a low pressure threshold, the controller 1705 may apply a sufficiently low voltage difference to the valve chip 1709a so that the valve flaps thereof open thereby allowing fluid flow from the high pressure supply chamber 1707a to the regulated chamber 1707b, and the controller 1705 may apply a sufficiently high voltage difference to the valve chip 1709b so that the valve flaps thereof close thereby blocking fluid flow from the regulated chamber 1707b to the low pressure exhaust chamber 1707c. Fluid communication is thus provided from the high pressure supply though the high pressure supply chamber 1707a, through the valve chip 1709a, and through the regulated chamber 1707b to the regulated port 1721.

If a pressure in the regulated chamber 1707b rises above a high pressure threshold, the controller 1705 may apply a sufficiently high voltage difference to the valve chip 1709a so that the valve flaps thereof close thereby blocking fluid flow from the high pressure supply chamber 1707a to the regulated chamber 1707b, and the controller 1705 may apply a sufficiently low voltage difference to the valve chip 1709b so that the valve flaps thereof open thereby allowing fluid flow from the regulated chamber 1707b to the low pressure exhaust chamber 1707c. Fluid communication is thus provided from the regulated port 1721 through the regulated chamber 1707b, through the valve chip 1709b, and through the low pressure exhaust chamber 1707c to the low pressure exhaust.

Moreover, opening and closing of valve flaps of the valve chips 1707a-b may be timed so that both valve chips are not open at the same time. Time delays may also be provided between closing one valve and opening the other valve to improve fluid flows, reduce pressure spikes, etc. The valve chips 1707a-b, the controller 1705, and/or a housing 1703 of the pressure regulator 1701 may be provided as discussed above, for example, with respect to FIGS. 1-3, 5, 6B, and 10-15. While the high pressure supply and low pressure exhaust ports are shown at ends of the pressure regulator 1701 of FIG. 17, other placements (such as on a side of the pressure regulator) may be provided.

While the present invention has been particularly shown and described with reference to embodiments thereof, it will be understood by those skilled in the art that various changes in form and details may be made therein without departing from the spirit and scope of the invention as defined by the appended claims and their equivalents.

That which is claimed:

1. A valve assembly comprising:
   a main housing defining at least three chambers, a first chamber configured to be coupled to a high pressure supply port, a second chamber configured to be coupled to an output port, and a third chamber configured to be coupled to a low pressure exhaust port wherein the second chamber is physically oriented between the first and third chambers;
   a first electro-statically actuated valve between the first and second chambers wherein the first electro-statically actuated valve allows or substantially blocks fluid communication between the first chamber and the second chamber responsive to a first electrical signal;
   a second electro-statically actuated valve between the second and third chambers wherein the second electro-statically actuated valve allows or substantially blocks fluid communication between the second chamber and the third chamber responsive to a second electrical signal; and
   a controller configured to generate the electrical signals for the respective electro-statically actuated valves, the controller being further configured to apply a first electrical potential as the first electrical signal to actuate the first electro-statically actuated valve thereby substantially blocking fluid communication between the first chamber and the second chamber, removing the first electrical potential as the first electrical signal, and after removing the first electrical potential, applying a second electrical potential as the first electrical signal to actuate the first electro-statically actuated valve thereby substantially blocking fluid communication between the first chamber and the second chamber wherein the first and second electrical potentials have reversed polarities.

2. A valve assembly according to claim 1 wherein the main housing further defines a fourth chamber configured to be coupled to a second output port, and a fifth chamber configured to be coupled to a low pressure exhaust port wherein the fourth chamber is physically oriented between the first and fifth chambers, the valve further comprising:

a third electro-statically actuated valve between the first and fourth chambers wherein the third electro-statically actuated valve allows or substantially blocks fluid communication between the first chamber and the fourth chamber responsive to a third electrical signal; and a fourth electro-statically actuated valve between the fourth and fifth chambers wherein the fourth electro-statically actuated valve allows or substantially blocks fluid communication between the fourth chamber and the fifth chamber responsive to a fourth electrical signal.

3. A valve assembly according to claim 2 wherein the first, second, third, and fourth electro-statically actuated valves are provided on a same substrate.

4. A valve assembly according to claim 2 wherein the third and fifth chambers are coupled to a same low pressure exhaust port.

5. A valve assembly according to claim 2 wherein the third and fifth chambers are coupled to different low pressure exhaust ports.

6. A valve assembly according to claim 1 wherein the first and second electro-statically actuated valves comprise respective first and second valve chips with each valve chip including at least one respective electro-statically actuated valve flap thereon.

7. A valve assembly according to claim 6 wherein the first valve chip is spaced apart from the second valve chip.

8. A valve assembly according to claim 6 wherein the first valve chip is non-parallel with respect to the second valve chip.

9. A valve assembly according to claim 6 wherein the first valve chip comprises, a substrate having first and second opposing faces, at least one hole through the substrate between the first and second faces, and a pair of input pads thereon, and at least one electro-statically actuated valve flap on the substrate with the at least one valve flap being associated with the at least one hole in the substrate, wherein the at least one flexible valve flap is configured to open or substantially block the at least one hole responsive to the first electrical signal applied to the pair of input pads, wherein the substrate is supported in the housing at edges thereof so that central portions of the first and second faces of the substrate are respectively exposed to the first and second chambers and so that a fluid seal is provided between the housing and edges of the substrate.

10. A valve assembly according to claim 1 wherein the main housing further defines a fourth chamber configured to be coupled to a second output port and a fifth chamber configured to be coupled to a low pressure exhaust port, the valve assembly further comprising:

a third electro-statically actuated valve between the first and fourth chambers wherein the third electro-statically actuated valve allows or substantially blocks fluid communication between the first chamber and the fourth chamber responsive to a third electrical signal;

a fourth electro-statically actuated valve between the fourth and fifth chambers wherein the fourth electro-statically actuated valve allows or substantially blocks fluid communication between the fourth chamber and the fifth chamber responsive to a fourth electrical signal; and wherein the controller is configured to generate the first, second, third, and fourth electrical signals for the respective electro-statically actuated valves.

11. A valve assembly according to claim 1 wherein the controller is
configured to generate the first and second electrical signals for the respective electro-statically actuated valves.

12. A valve assembly according to claim 11 wherein the controller includes memory programmed with first operating instructions defining a first sequence of operations and second operating instructions defining a second sequence of operations, wherein one of the first and second operating instructions are selected for operation at a given time.

13. A valve assembly according to claim 12 wherein the first operating instructions are selected for use during a first time period and wherein the second operating instructions are selected for use during a second time period.

14. A valve assembly according to claim 11 wherein the controller generates the electrical signals using electrical energy from at least one of a battery, a capacitor, a fuel cell, and/or a radio isotope.

15. A valve assembly according to claim 11 wherein the controller includes a rechargeable power supply, wherein the controller generates the electrical signals using electrical energy from the rechargeable power source.

16. A valve assembly according to claim 11 wherein the controller generates the electrical signals using an external power source.

17. A valve assembly according to claim 16 wherein the external power source comprises a DC power source in the range of about 3 volts DC to about 48 volts DC and/or an AC power source in the range of about 24 volts AC to about 240 volts AC.

18. A valve assembly according to claim 11 wherein the controller includes a transistor coupled in series with a power source and a coil wherein the transistor and the coil are configured to generate electrical power for the electrical signals having a higher voltage than the power source.

19. A valve assembly according to claim 11 wherein the controller includes a capacitive charge pump configured to generate electrical power for the electrical signals having a higher voltage than the power source.

20. A valve assembly according to claim 11 wherein the controller includes a transistor coupled in series with a power source and a transformer wherein the transistor and the transformer are configured to generate electrical power for the electrical signals having a higher voltage than the power source.

21. A valve assembly according to claim 11 wherein the controller includes a transistor coupled in series with a power source and an autotransformer wherein the transistor and autotransformer are configured to generate electrical power for the electrical signals having a higher voltage than the power source.

22. A valve assembly according to claim 11 wherein the controller generates the electrical signals using electrical energy generated using at least one of light, heat, and/or mechanical vibration.

23. A valve assembly according to claim 11 wherein the controller generates the electrical signals using electrical energy generated using an environmental source of energy proximate to the controller.

24. A valve assembly according to claim 23 wherein the controller generates the electrical energy using at least one of light, heat, and/or mechanical vibration, and wherein the electrical energy is stored using at least one of a battery, capacitor, and/or inductor.

25. A valve assembly according to claim 1 wherein the controller includes memory configured to be programmed with first operating instructions defining a first sequence of operations and to be reprogrammed with second operating instructions defining a second sequence of operations.

26. A valve assembly comprising:
a main housing defining at Least three chambers, a first chamber configured to be coupled to a high pressure supply port, a second chamber configured to be coupled to an output port, and a third chamber configured to be coupled to a low pressure exhaust port wherein the second chamber is physically oriented between the first and third chambers;
a first electro-statically actuated valve between the first and second chambers wherein the first electro-statically actuated valve allows or substantially blocks fluid communication between the first chamber and the second chamber responsive to a first electrical signal wherein the first electro-statically actuated valve comprises a substrate having an electro- statically actuated valve member thereon and a pair of terminals, and wherein the electro- statically actuated valve member is configured to allow fluid communication between the first and second chambers in an open position spaced apart from the substrate and to substantially block fluid communication between the first and second chambers in a closed position adjacent the substrate wherein the first electrical signal is applied to the pair of terminals;
a second electro-statically actuated valve between the second and third chambers wherein the second electro-statically actuated valve allows or substantially blocks fluid communication between the second chamber and the third chamber responsive to a second electrical signal; and
a controller configured to generate the electrical signals for the respective electro-statically actuated valves, the controller being further configured to apply a first electrical potential having a first magnitude as the first electrical signal applied to the pair of terminals when the valve member is in the open position spaced apart from the substrate to actuate the valve member to the closed position adjacent -the substrate substantially blocking fluid communication between the first and second chambers, and after actuating the valve member to the closed position adjacent the substrate, to apply a second electrical potential having a second magnitude as the first electrical signal applied to the pair of terminals to maintain the valve member in the closed position adjacent the substrate to thereby maintain substantial blocking of fluid communication between the first and second chambers, wherein the first magnitude is greater than the second magnitude.

27. A valve assembly according to claim 26 wherein the controller is further configured to apply a first electrical potential as the first electrical signal to actuate the first electro-statically actuated valve thereby substantially blocking fluid communication between the first chamber and the second chamber, removing the first electrical potential as the first electrical signal, and after removing the first electrical potential, applying a second electrical potential as the first electrical signal to actuate the first electro-statically actuated valve thereby substantially blocking fluid communication between the first chamber and the second chamber wherein the first and second electrical potentials have reversed polarities.

28. A valve assembly according to claim 1 wherein the first and second electro-statically actuated valves are provided on a same substrate.

29. A valve assembly according to claim 1 wherein the first and second electro-statically actuated valves are provided on respective first and second substrates.

30. A valve assembly according to claim 29 wherein the first and second substrates are provided in a non-parallel arrangement.

31. A valve assembly according to claim 1 further comprising:
a pressure sensor configured to measure a pressure in the second chamber; and
wherein the controller is coupled to the pressure sensor and to the first and second electro-statically actuated valves, wherein the controller is configured to generate the first and second electrical signals for the respective electro-statically actuated valves to maintain a pressure in the second chamber responsive to the pressure measured in the second chamber.

32. A valve assembly according to claim 1 further comprising:
a spool-type valve including a body defining a central cavity and a supply and actuator ports coupled to the central cavity and including a spool in the central cavity, wherein the spool is moveable between first and second positions in the central cavity so that in the first position of the spool fluid communication is provided between the supply and actuator ports and so that in the second position of the spool fluid communication is substantially blocked between the supply and actuator ports, and wherein an end of the cavity is in fluid communication with the second chamber; and
wherein the controller is coupled to the first and second electro-statically actuated valves, wherein the controller is configured to generate the first and second electrical signals for the respective electro-statically actuated valves to control movement of the spool between the first and second positions.

33. A valve assembly comprising:
a main housing defining at least three chambers, a first chamber configured to be coupled to a high pressure supply port, a second chamber configured to be coupled to an output port, and a third chamber configured to be coupled to a low pressure exhaust port, wherein the second chamber is physically oriented between the first and third chambers;
a first photo-lithographically fabricated valve between the first and second chambers wherein the first photo-lithographically fabricated valve allows or substantially blocks fluid communication between the first chamber and the second chamber responsive to a first electrical signal wherein the first photo-lithographically fabricated valve comprises a substrate having an electro-statically actuated valve member thereon and a pair of terminals, and wherein the electro-statically actuated valve member is configured to allow fluid communication between the first and second chambers in an open position spaced apart from the substrate and to substantially block fluid communication between the first and second chambers in a closed position adjacent the substrate wherein the first electrical signal is applied to the pair of terminals;
a second photo-lithographically fabricated valve between the second and third chambers wherein the second photo-lithographically fabricated valve allows or substantially blocks fluid communication between the second chamber and the third chamber responsive to a second electrical signal; and
a controller configured to generate the electrical signals for the respective photo -lithographically fabricated valves, the controller being further configured to apply a first electrical potential having a first magnitude as the first electrical signal applied to the pair of terminals when the valve member is in the open position spaced apart from the substrate to actuate the valve member to the closed position adjacent the substrate substantially blocking fluid communication between the first and second chambers, and after actuating the valve member to the closed position adjacent the substrate, to apply a second electrical potential having a second magnitude as the first electrical signal applied to the pair of terminals to maintain the valve member in the closed position adjacent the substrate to thereby maintain substantial blocking of fluid communication between the first and second chambers, wherein the first magnitude is greater than the second magnitude.

34. A valve assembly according to claim 33 wherein the first photo-lithographically fabricated valve comprises a substrate of at least one of glass, silicon, and/or quartz having at least one hole through the substrate.

35. A valve assembly according to claim 34 wherein the first photo-lithographically fabricated valve comprises at least one electro-statically actuated valve member adjacent to the at least one hole through the substrate.

36. A valve assembly according to claim 35 wherein the valve member comprises a flexible valve flap.

37. A valve assembly according to claim 1, wherein the second chamber is configured to be coupled to the output port is separate from the first and third chambers.

38. A valve assembly according to claim 29 wherein the first and second substrates are spaced apart.

39. A valve assembly according to claim 38 wherein the first and second substrates are arranged in different planes.

40. A valve assembly according to claim 1 further comprising:
a pneumatic actuator including an actuator housing and a moveable piston in the actuator housing, wherein the moveable piston separates first and second actuator chambers of the actuator housing and wherein the output port provides fluid coupling between the second chamber of the main housing and the first actuator chamber; and
wherein the controller is coupled to the first and second electro-statically actuated valves, wherein the controller is configured to generate the first and second electrical signals for the respective electro-statically actuated valves to control movement of the piston.

41. A valve assembly according to claim 18 wherein the controller includes a transistor coupled in series with a power source and a transformer wherein the transistor and the transformer are configured to generate electrical power for the electrical signals having a higher voltage than the power source.

42. A valve assembly according to claim 18 wherein the controller includes a transistor coupled in series with a power source and an autotransformer wherein the transistor and autotransformer are configured to generate electrical power for the electrical signals having a higher voltage than the power source.

43. A valve assembly according to claim 1 wherein the first electro-statically actuated valve is physically oriented between the first and second chambers and between the first and third chambers, and wherein the second electro-statically actuated valve is physically oriented between the second and third chambers and between the first and third chambers.

44. A valve assembly according to claim 2 wherein the first electro-statically actuated valve is physically oriented between the first and second chambers and between the first and third chambers, wherein the second electro-statically actuated valve is physically oriented between the second and third chambers and between the first and third chambers, wherein the third electro-statically actuated valve is physically oriented between the first and fourth chambers and between the first and fifth chambers, and wherein the fourth electro-statically actuated valve is physically oriented between the fourth and fifth chambers and between the first and fifth chambers.

45. A valve assembly according to claim 3 wherein the same substrate comprises a same planar substrate.

46. A valve assembly comprising:
a main housing defining at least three chambers, a first chamber configured to be coupled to a high pressure supply port, a second chamber configured to be coupled to an output port, and a third chamber configured to be coupled to a low pressure exhaust port;
a first electro-statically actuated valve between the first and second chambers wherein the first electro-statically actuated valve allows or substantially blocks fluid communication between the first chamber and the second chamber responsive to a first electrical signal;
a second electro-statically actuated valve between the second and third chambers wherein the second electro-statically actuated valve allows or substantially blocks fluid communication between the second chamber and the third chamber responsive to a second electrical signal; and
a controller configured to generate the electrical signals for the respective electro-statically actuated valves, the controller being further configured to apply a first electrical potential as the first electrical signal to actuate the first electro-statically actuated valve thereby substantially blocking fluid communication between the first chamber and the second chamber, removing the first electrical potential as the first electrical signal, and after removing the first electrical potential, applying a second electrical potential as the first electrical signal to actuate the first electro-statically actuated valve thereby substantially blocking fluid communication between the first chamber and the second chamber wherein the first and second electrical potentials have reversed polarities.

47. A valve assembly comprising:
a main housing defining at least three chambers, a first chamber configured to be coupled to a high pressure supply port, a second chamber configured to be coupled to an output port, and a third chamber configured to be coupled to a low pressure exhaust port;
a first electro-statically actuated valve between the first and second chambers wherein the first electro-statically actuated valve allows or substantially blocks fluid communication between the first chamber and the second chamber responsive to a first electrical signal wherein the first electro-statically actuated valve comprises a substrate having an electro-statically actuated valve member thereon and a pair of terminals wherein the electro-statically actuated valve member is configured to allow fluid communication between the first and second chambers in an open position spaced apart from the substrate and to substantially block fluid communication between the first and second chambers in a closed position adjacent the substrate wherein the first electrical signal is applied to the pair of terminals;
a second electro-statically actuated valve between the second and third chambers wherein the second electro-statically actuated valve allows or substantially blocks fluid communication between the second chamber and the third chamber responsive to a second electrical signal; and a controller configured to generate the electrical signals for the respective electo- statically actuated valves, the controller being further configured to apply a first electrical potential having a first magnitude as the first electrical signal applied to the pair of terminals when the valve member is in the open position spaced apart from the substrate to actuate the valve member to the closed position adjacent the substrate substantially blocking fluid communication between the first and second chambers, and after actuating the valve member to the closed position adjacent the substrate, to apply a second electrical potential having a second magnitude as the first electrical signal applied to the pair of terminals to maintain the valve member in the closed position adjacent the substrate to thereby maintain substantial blocking of fluid communication between the first and second chambers, wherein the first magnitude is greater than the second magnitude.

48. A valve assembly comprising:

a main housing defining at least three chambers, a first chamber configured to be coupled to a high pressure supply port, a second chamber configured to be coupled to an output port, and a third chamber configured to be coupled to a low pressure exhaust port, wherein the second chamber is physically oriented between the first and third chambers;

a first photo-lithographically fabricated valve between the first and second chambers wherein the first photo-lithographically fabricated valve allows or substantially blocks fluid communication between the first chamber and the second chamber responsive to a first electrical signal;

a second photo-lithographically fabricated valve between the second and third chambers wherein the second photo-lithographical fabricated valve allows or substantially blocks fluid communication between the second chamber and the third chamber responsive to a second electrical signal; and a controller configured to generate the electrical signals for the respective photo- lithographically fabricated valves, the controller being further configured to apply a first electrical potential as the first electrical signal to actuate the first photo-lithographically fabricated valve thereby substantially blocking fluid communication between the first chamber and the second chamber, removing the first electrical potential as the first electrical signal, and after removing the first electrical potential, applying a second electrical potential as the first electrical signal to actuate the first photo-lithographically fabricated valve thereby substantially blocking fluid communication between the first chamber and the second chamber wherein the first and second electrical potentials have reversed polarities.

* * * * *